(12) United States Patent
Lee

(10) Patent No.: US 11,531,492 B2
(45) Date of Patent: Dec. 20, 2022

(54) DEVICE AND METHOD OF OPERATING THE SAME

(71) Applicant: SK hynix Inc., Icheon-si (KR)

(72) Inventor: Joo Young Lee, Seoul (KR)

(73) Assignee: SK hynix Inc., Icheon-si (KR)

( * ) Notice: Subject to any disclaimer, the term of this patent is extended or adjusted under 35 U.S.C. 154(b) by 65 days.

(21) Appl. No.: 16/707,744

(22) Filed: Dec. 9, 2019

(65) Prior Publication Data
US 2020/0371715 A1 Nov. 26, 2020

(30) Foreign Application Priority Data

May 23, 2019 (KR) .......................... 10-2019-0060779

(51) Int. Cl.
*G06F 3/06* (2006.01)

(52) U.S. Cl.
CPC .......... *G06F 3/0659* (2013.01); *G06F 3/0604* (2013.01); *G06F 3/064* (2013.01); *G06F 3/0631* (2013.01); *G06F 3/0673* (2013.01)

(58) Field of Classification Search
CPC .... G06F 3/0659; G06F 3/0406; G06F 3/0631; G06F 3/064; G06F 3/0673; G06F 3/0604
See application file for complete search history.

(56) References Cited

U.S. PATENT DOCUMENTS

| | | | |
|---|---|---|---|
| 2009/0222615 A1* | 9/2009 | Kurashige | G06F 3/0679 711/103 |
| 2010/0262761 A1* | 10/2010 | Borchers | G06F 3/0679 711/103 |
| 2011/0010488 A1* | 1/2011 | Aszmann | G06F 3/0688 711/103 |
| 2016/0077968 A1* | 3/2016 | Sela | G06F 12/0246 711/118 |
| 2018/0081594 A1* | 3/2018 | Jung | G06F 3/0613 |
| 2019/0095364 A1* | 3/2019 | Yang | G11C 16/14 |
| 2019/0163623 A1* | 5/2019 | Bae | G11C 16/10 |
| 2019/0179698 A1* | 6/2019 | Liu | G06F 3/0614 |
| 2019/0254478 A1* | 8/2019 | Ries | A47J 37/0704 |
| 2019/0354478 A1* | 11/2019 | Kashyap | G06F 3/064 |

FOREIGN PATENT DOCUMENTS

| | | |
|---|---|---|
| KR | 10-2018-0026876 A | 3/2018 |
| KR | 10-2018-0083093 A | 7/2018 |

* cited by examiner

*Primary Examiner* — Ryan Bertram

(57) ABSTRACT

Provided herein may be a storage device and a method of operating the storage device. A memory controller may include a storage area manager and a write operation controller. The storage area manager may allocate a plurality of memory devices to a first group and a second group in response to a storage area setting command. The write operation controller may control a group selected from the first group and the second group according to a type of a write request to store write data. At least one memory devices in the first group includes memory blocks storing n data bits. At least one memory devices in the second group includes memory blocks storing m data bits.

12 Claims, 18 Drawing Sheets

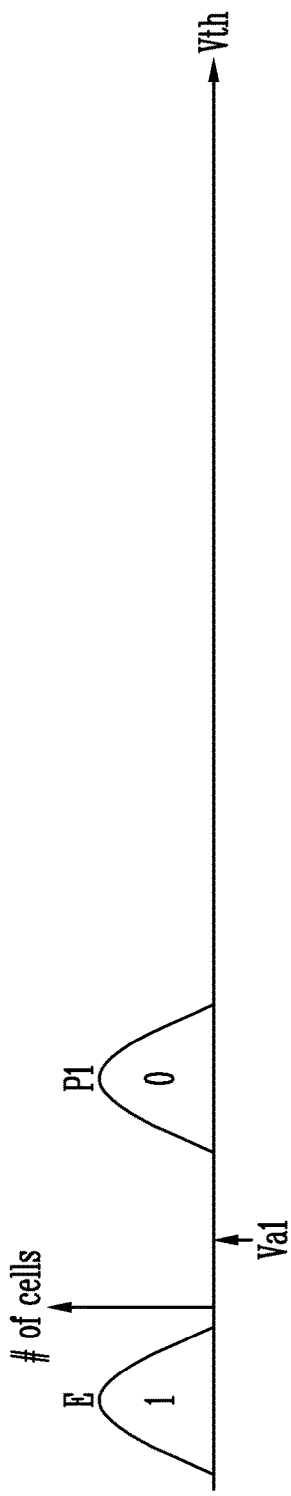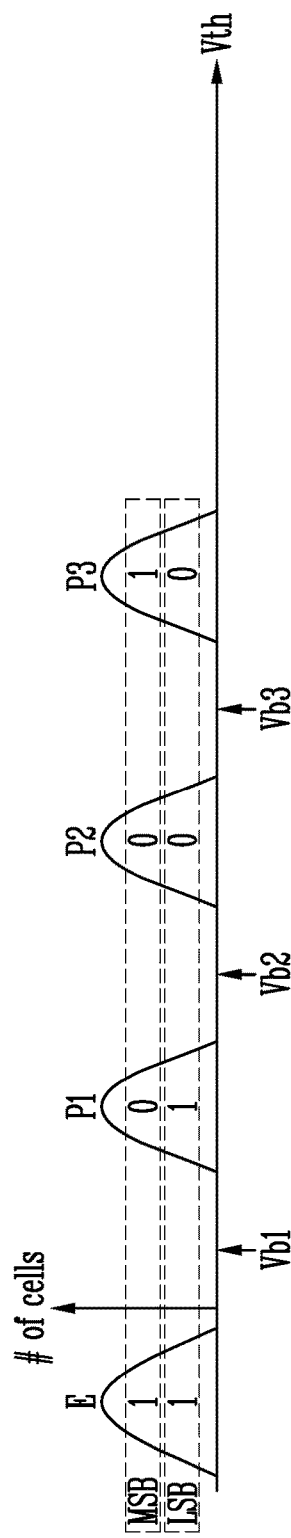

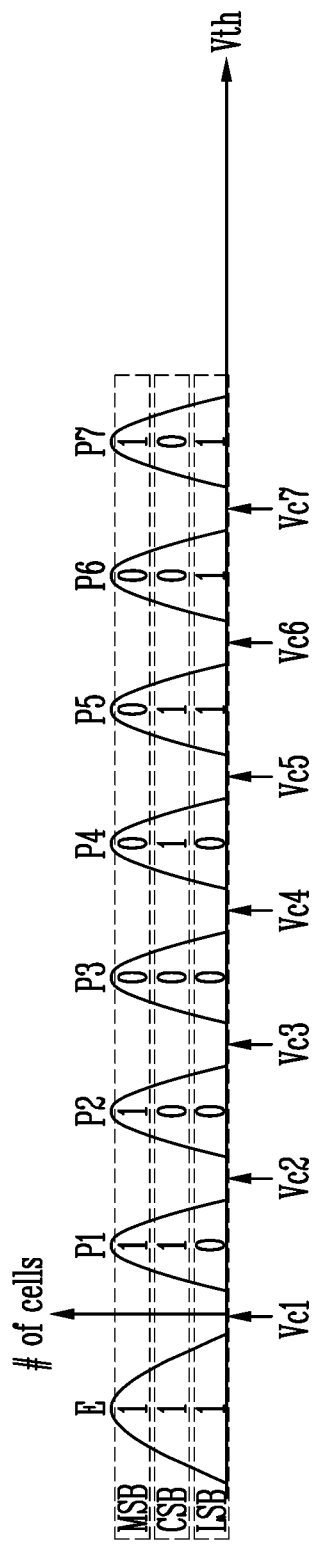

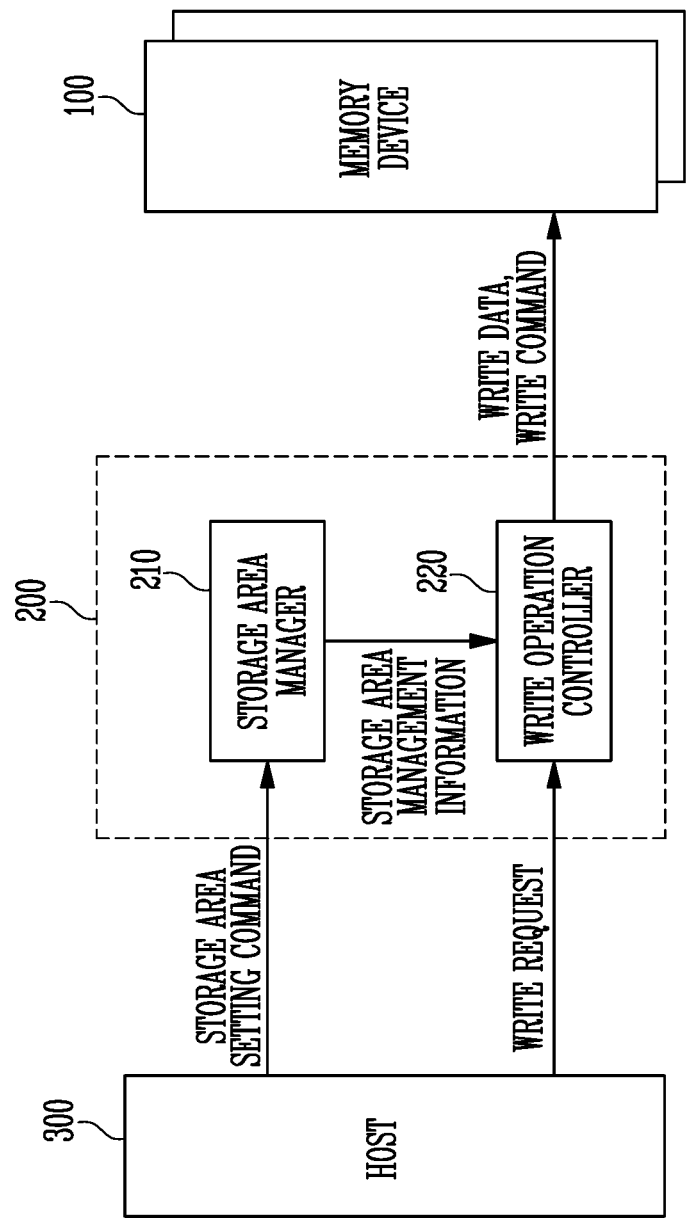

FIG. 11

STORAGE AREA MANAGEMENT INFORMATION

| FIRST GROUP | SECOND GROUP |
|---|---|
| Die_1, Die_2 | Die_3, Die_4 |

DEVICE AND METHOD OF OPERATING THE SAME

CROSS-REFERENCE TO RELATED APPLICATION

The present application claims priority under 35 U.S.C. § 119(a) to Korean Patent Application Number 10-2019-0060779 filed on May 23, 2019 in the Korean Intellectual Property Office, the entire disclosure of which is incorporated herein by reference.

BACKGROUND

1. Technical Field

Various embodiments of the present disclosure generally relate to an electronic device, and more particularly, to a storage device and a method of operating the storage device.

2. Related Art

A storage device is a device which stores data under the control of a host device, such as a computer or a smartphone. The storage device may include a memory device in which data is stored and a memory controller which controls the memory device. Such memory devices may be classified into volatile memory devices and nonvolatile memory devices.

A volatile memory device is a memory device in which data is stored only when power is supplied, and in which stored data is lost when the supply of power is interrupted. Examples of volatile memory devices include a Static Random Access Memory (SRAM) and a Dynamic Random Access Memory (DRAM).

A nonvolatile memory device is a memory device in which stored data is retained even when the supply of power is interrupted. Examples of nonvolatile memory devices include a Read Only Memory (ROM), a Programmable ROM (PROM), an Electrically Programmable ROM (EPROM), an Electrically Erasable and Programmable ROM (EEPROM), and a flash memory.

SUMMARY

Various embodiments of the present disclosure are directed to a storage device having improved write performance and a method of operating the storage device.

An embodiment of the present disclosure may provide for a memory controller for controlling a plurality of memory devices. The memory controller may include a storage area manager configured to allocate the plurality of memory devices to a first group and a second group in response to a storage area setting command; and a write operation controller configured to control a group selected from the first group and the second group according to a type of a write request received from the host to store write data, wherein at least one memory device included in the first group comprises memory blocks storing n data bits, where n is a natural number of 1 or more, and wherein at least one memory device included in the second group of memory devices comprises memory blocks storing m data bits, where m is different from n, and where m is a natural number of 2 or more.

An embodiment of the present disclosure may provide for a storage device. The storage device may include a plurality of memory devices, and a memory controller. The memory controller may be configured to allocate the plurality of memory devices to a first group and a second group in response to a storage area setting command received from a host, and to control a group selected from the first group and the second group according to a write request received from the host to store write data, wherein at least one memory device included in the first group comprises memory blocks storing n data bits, where n is a natural number of 1 or more, and wherein at least one memory device included in the second group comprises memory blocks storing m data bits, where m is a natural number greater than n.

An embodiment of the present disclosure may provide for a method of operating a storage device, the storage device including a plurality of memory devices and a memory controller for controlling the memory devices. The method may include allocating the plurality of memory devices to a first group and a second group in response to a storage area setting command received from a host; and storing write data in memory devices included in a group selected from the first group and the second group according to a type of a write request, wherein at least one memory device included in memory devices included in the first group comprises memory blocks storing n data bits, where n is a natural number of 1 or more, wherein at least one memory device included in memory devices included in the second group comprises memory blocks storing m data bits, where m is a natural number greater than n, and wherein the type of the write request indicates whether the write request is a fast write request or a normal write request.

BRIEF DESCRIPTION OF THE DRAWINGS

FIGS. 7A to 7C are diagrams illustrating data storage schemes according to embodiments of the present disclosure.

FIG. 8 is a diagram illustrating a configuration and operation of a memory controller of FIG. 1 according to an embodiment of the present disclosure.

FIG. 11 is a diagram illustrating storage area management information of FIG. 10 according to an embodiment of the present disclosure.

DETAILED DESCRIPTION

The descriptions should not be construed as being limiting embodiments contemplated by the disclosure to those described in the specification or application.

The present disclosure will be described in detail based on embodiments.

Figure 1:
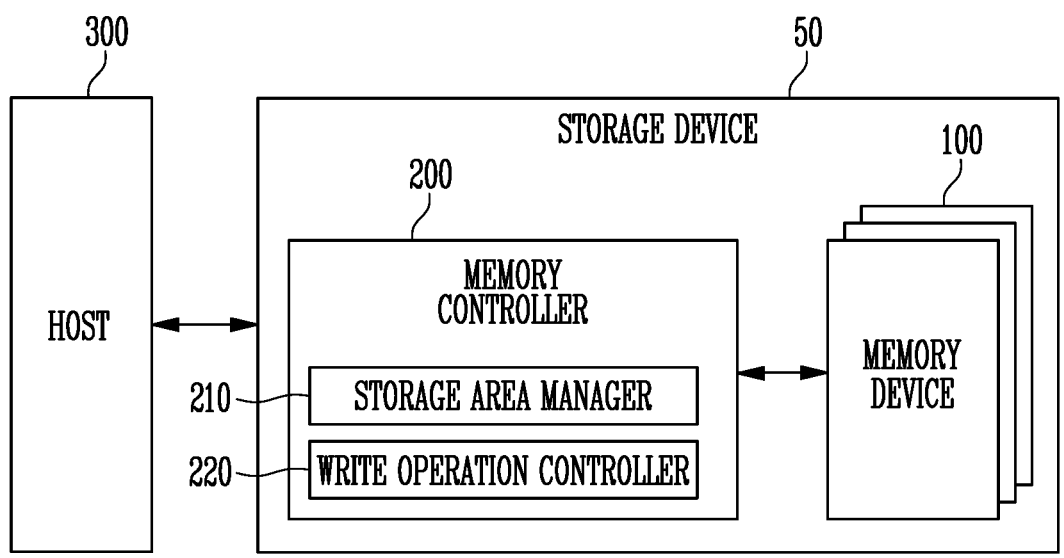
FIG. 1 is a diagram illustrating a storage device according to an embodiment of the present disclosure.

FIG. 1 is a diagram illustrating a storage device according to an embodiment of the present disclosure.

Referring to FIG. 1, a storage device 50 may include memory devices 100 and a memory controller 200. The storage device 50 may be a device which stores data under the control of a host 300, such as a mobile phone, a smartphone, an MP3 player, a laptop computer, a desktop computer, a game console, a television (TV), a tablet personal computer (PC), or an in-vehicle infotainment system as non-limiting examples.

The storage device 50 may be manufactured as any one of various types of storage devices according to a host interface that is a scheme for communication with the host 300. The storage device 50 may be implemented as any one of various types of storage devices, such as, for example, a solid state drive (SSD), a multimedia card (MMC), an embedded MMC (eMMC), a reduced size MMC (RS-MMC), or a micro-MMC, a secure digital card (SD), a mini-SD, or a micro-SD, a universal storage bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick.

The storage device 50 may be manufactured in any one of various types of package forms. For example, the storage device 50 may be manufactured as a package on package (POP), system in package (SIP), system on chip (SOC), multi-chip package (MCP), chip on board (COB), wafer-level fabricated package (WFP), and wafer-level stack package (WSP).

Each memory device 100 may store data. The memory device 100 is operated in response to or under the control of the memory controller 200. The memory device 100 may include a memory cell array including a plurality of memory cells which store data.

Each of the memory cells may be implemented as a single-level cell (SLC) capable of storing one data bit, a multi-level cell (MLC) capable of storing two data bits, a triple-level cell (TLC) capable of storing three data bits, or a quad-level cell (QLC) capable of storing four data bits.

The memory cell array may include a plurality of memory blocks. Each memory block may include a plurality of memory cells. One memory block may include a plurality of pages. In an embodiment, each page may be a unit in which data is stored in the memory device 100 or in which data stored in the memory device 100 is read.

In detail, each memory block may include a plurality of word lines. Memory cells may be coupled to each word line. The memory cells coupled to the same word line may be defined as one physical page. At least one logical page may correspond to one physical page according to the number of data bits stored in each memory cell.

For example, when the memory cell is a single-level cell which stores one data bit, one logical page may correspond to one physical page. When the memory cell is a multi-level cell which stores two data bits, two logical pages may correspond to one physical page. The two logical pages may be a Most Significant Bit (MSB) page, which stores MSB data, and a Least Significant Bit (LSB) page, which stores LSB data, respectively.

A memory block may be a unit by which data is erased.

In an embodiment, the memory device 100 may take many alternative forms, such as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change memory (PRAM), a magnetoresistive RAM (MRAM), a ferroelectric RAM (FRAM), or a spin transfer torque RAM (STT-RAM). In the present specification, for convenience of description, descriptions will assume that the memory device 100 is a NAND flash memory.

The memory device 100 may receive a command and an address from the memory controller 200, and may access an area of the memory cell array selected by the address. That is, the memory device 100 may perform an operation in response to a command on an area selected by the address. As examples, the memory device 100 may perform a write operation (i.e., program operation), a read operation, and an erase operation. During a program operation, the memory device 100 may program data to the area selected by the address. During a read operation, the memory device 100 may read data from the area selected by the address. During an erase operation, the memory device 100 may erase data stored in the area selected by the address.

The memory controller 200 controls the overall operation of the storage device 50.

When power is applied to the storage device 50, the memory controller 200 may run firmware (FW). In an embodiment, when the memory device 100 is a flash memory device, the memory controller 200 may run firmware such as a flash translation layer (FTL) for controlling communication between the host 300 and the memory device 100.

In an embodiment, the memory controller 200 may receive data and a logical block address (LBA) from the host 300, and may translate the logical block address into a physical block address (PBA), indicating the address of memory cells of the memory device 100 in which data is to be stored.

The memory controller 200 may control the memory device 100 so that a program operation, a read operation or an erase operation is performed in response to a request received from the host 300. During a program operation, the memory controller 200 may provide a program command, a physical block address, and data to the memory device 100. During a read operation, the memory controller 200 may provide a read command and a physical block address to the memory device 100. During an erase operation, the memory controller 200 may provide an erase command and a physical block address to the memory device 100.

In an embodiment, the memory controller 200 may autonomously generate a command, an address, and data in the absence of a request from the host 300, and may transmit them to the memory device 100. For example, the memory controller 200 may provide commands, addresses, and data to the memory device 100 so as to perform background operations, such as a program operation for wear leveling, and a program operation for garbage collection.

In an embodiment, the memory controller 200 may control at least two memory devices 100. In this case, the memory controller 200 may control the memory devices 100 according to an interleaving or alternating scheme to improve operating performance. For example, the operating periods of the at least two memory devices 100 overlap each other in an interleaving scheme.

In an embodiment, the memory controller 200 may include a storage area manager 210 and a write operation controller 220.

The storage area manager 210 may allocate the plurality of memory devices 100 into first and second groups according to a data storage scheme, in response to a storage area setting command received from the host 300. The plurality of memory devices 100 may be coupled to a common memory controller 200 through a channel.

The data storage scheme may be classified based on the number of data bits stored in each memory cell included in each memory device.

For example, each of the memory devices in the first group may include memory blocks, each memory block storing n data bits (where n is a natural number of 1 or more). Each of memory devices in the second group may include memory blocks, each memory block storing m data bits (where m is a natural number greater than n). Because the number of data bits stored in each memory cell of the memory devices in the first group is less than that of the number of data bits stored in each memory cell of the memory devices in the second group, the speed of a data write operation of the first group may be higher than the speed of a data write operation of the second group.

A storage area setting command received from the host 300 may include size information of a storage area in which data corresponding to a fast write operation can be stored.

The storage area manager 210 may adjust the number of memory devices in the first group based on the ratio of the storage area in which data corresponding to a fast write operation is stored, to the entire storage area of the plurality of memory devices 100.

The storage area manager 210 may allocate, for each of the first group and the second group, at least two memory blocks included in different memory devices, among the memory devices included in the respective first or second group, as a super block.

In an embodiment, the storage area manager 210 may allocate at least two memory blocks included in different planes, among planes included in memory devices of respective first or second group, as a super block.

The storage area manager 210 may generate storage area management information indicating the memory devices included in the first group and the second group respectively from among a plurality of memory devices 100.

The generated storage area management information may be stored in the plurality of memory devices 100 in various forms.

When the storage device 50 boots up, the storage area manager 210 may allocate memory devices 100 from a plurality of memory devices to the first group and the second group, based on the storage area management information stored in the plurality of memory devices 100.

The storage area manager 210 may provide the generated storage area management information to the write operation controller 220. The write operation controller 220 may determine, using the storage area management information, which of the first group and the second group will be used in an operation.

The write operation controller 220 may control the plurality of memory devices 100 so that the memory devices 100 store write data corresponding to a write request received from the host 300.

The write operation controller 220 may control a write operation so that the write data is stored in memory devices included in any one of the first group and the second group according to the type of the write request.

The write operation controller 220 may determine the type of write request based on flag information included in the write request. The flag information may indicate whether the write request received from the host 300 is a fast write request or a normal write request.

When the write request is a fast write request, the write operation controller 220 may control the write operation so that the memory devices included in the first group store the write data. When the write request is a normal write request, the write operation controller 220 may control the write operation so that memory devices included in the second group store the write data.

The host 300 may communicate with the storage device 50 using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods, by way of non-limiting examples.

Figure 2:
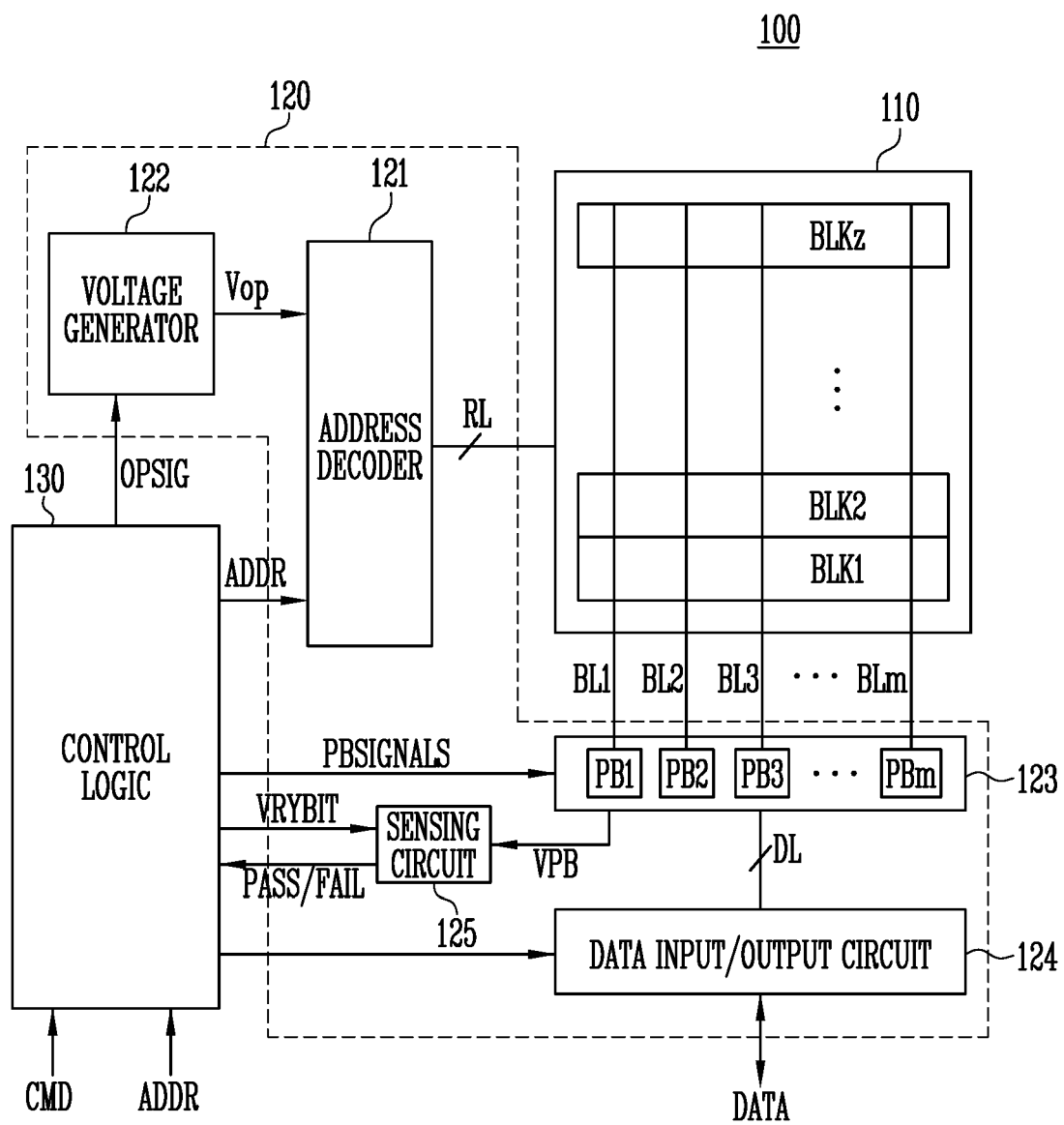
FIG. 2 is a diagram illustrating a structure of a memory device of FIG. 1 according to an embodiment of the present disclosure.

FIG. 2 is a diagram illustrating a structure of a memory device of FIG. 1 according to an embodiment of the present invention.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are coupled to an address decoder 121 through row lines RL. The memory blocks BLK1 to BLKz are coupled to a read and write circuit 123 through bit lines BL1 to BLm. Each of the memory blocks BLK1 to BLKz may include a plurality of memory cells. In an embodiment, the plurality of memory cells may be nonvolatile memory cells. Memory cells coupled to the same word line, among the plurality of memory cells, are defined as one physical page. In other words, the memory cell array 110 may include a plurality of physical pages. In embodiments of the present disclosure, each of the memory blocks BLK1 to BLKz included in the memory cell array 110 may include a plurality of dummy cells. One or more dummy cells may be coupled in series between a drain select transistor and memory cells, and between a source select transistor and memory cells.

Each of the memory cells of the memory device 100 may be implemented as a single-level cell (SLC) capable of storing one data bit, a multi-level cell (MLC) capable of storing two data bits, a triple-level cell (TLC) capable of storing three data bits, or a quad-level cell (QLC) capable of storing four data bits.

The peripheral circuit 120 may include the address decoder 121, a voltage generator 122, the read and write circuit 123, a data input/output circuit 124, and a sensing circuit 125.

The peripheral circuit 120 may drive the memory cell array 110. For example, the peripheral circuit 120 may drive the memory cell array 110 so as to perform a program operation, a read operation, and an erase operation.

The address decoder 121 is coupled to the memory cell array 110 through the row lines RL. The row lines RL may include drain select lines, word lines, source selection lines, and a common source line. In accordance with embodiments of the present disclosure, the word lines may include normal word lines and dummy word lines. In accordance with embodiments of the present disclosure, the row lines RL may further include a pipe select line.

In an embodiment, the row lines RL may be local lines included in local line groups. Each of the local line groups may correspond to one memory block. The local line group may include a drain select line, local word lines, and a source select line.

The address decoder 121 may be operated under the control of the control logic 130. The address decoder 121 receives addresses ADDR from the control logic 130.

The address decoder 121 may decode a block address, among the received addresses ADDR. The address decoder 121 selects at least one of the memory blocks BLK1 to BLKz according to the decoded block address. The address decoder 121 may decode a row address RADD from among the received addresses ADDR. The address decoder 121 may select at least one word line WL of the selected memory block by applying voltages supplied from the voltage generator 122 to the at least one word line WL according to the decoded row address RADD.

During a program operation, the address decoder 121 may apply a program voltage to the selected word line and apply a pass voltage having a level lower than that of the program voltage to unselected word lines. During a program verify operation, the address decoder 121 may apply a verify voltage to the selected word line and apply a verify pass voltage having a level higher than that of the verify voltage to the unselected word lines.

During a read operation, the address decoder 121 may apply a read voltage to the selected word line and apply a read pass voltage having a level higher than that of the read voltage to the unselected word lines.

In accordance with an embodiment of the present disclosure, an erase operation of the memory device 100 is performed on a memory block basis. During an erase operation, the addresses ADDR input to the memory device 100 include a block address. The address decoder 121 may decode the block address and select a memory block according to the decoded block address. During the erase operation, the address decoder 121 may apply a ground voltage to word lines coupled to the selected memory block.

In accordance with an embodiment of the present disclosure, the address decoder 121 may decode a column address from among the received addresses ADDR. The decoded column address may be transferred to the read and write circuit 123. In an embodiment, the address decoder 121 may include components, such as a row decoder, a column decoder, and an address buffer.

The voltage generator 122 may generate a plurality of operating voltages Vop, using an external supply voltage, that is supplied to the memory device 100. The voltage generator 122 may be operated under the control of the control logic 130.

In an embodiment, the voltage generator 122 may generate an internal supply voltage by regulating the external supply voltage. The internal supply voltage generated by the voltage generator 122 is used as an operating voltage for the memory device 100.

In an embodiment, the voltage generator 122 may generate the plurality of operating voltages Vop using the external supply voltage or the internal supply voltage. The voltage generator 122 may generate various voltages required by the memory device 100. For example, the voltage generator 122 may generate a plurality of erase voltages, a plurality of program voltages, a plurality of pass voltages, a plurality of select read voltages, and a plurality of unselect read voltages.

The voltage generator 122 may include a plurality of pumping capacitors for receiving the internal supply voltage so as to generate a plurality of operating voltages Vop having various voltage levels, and may generate the plurality of operating voltages Vop by selectively enabling the plurality of pumping capacitors under the control of the control logic 130.

The generated operating voltages Vop may be supplied to the memory cell array 110 by the address decoder 121.

The read and write circuit 123 includes first to m-th page buffers PB1 to PBm. The first to m-th page buffers PB1 to PBm are coupled to the memory cell array 110 through the first to m-th bit lines BL1 to BLm, respectively. The first to m-th page buffers PB1 to PBm are operated under the control of the control logic 130.

The first to m-th page buffers PB1 to PBm perform data communication with the data input/output circuit 124. During a program operation, the first to m-th page buffers PB1 to PBm receive data DATA to be stored from the data input/output circuit 124 through data lines DL.

During a program operation, the first to m-th page buffers PB1 to PBm may transfer the data DATA to be stored, received through the data input/output circuit 124, to selected memory cells through the bit lines BL1 to BLm when a program pulse is applied to a selected word line. Memory cells in a selected page are programmed based on the received data DATA. Memory cells coupled to a bit line to which a program permission voltage (e.g., a ground voltage) is applied may have increased threshold voltages. The threshold voltages of memory cells coupled to a bit line to which a program inhibit voltage (e.g., a supply voltage) is applied may be maintained. During a program verify operation, the first to m-th page buffers PB1 to PBm read the data DATA stored in the selected memory cells from the selected memory cells through the bit lines BL1 to BLm.

During a read operation, the read and write circuit 123 may read data DATA from the memory cells in the selected page through the bit lines BL1 to BLm, and may store the read data DATA in the first to m-th page buffers PB1 to PBm.

During an erase operation, the read and write circuit 123 may allow the bit lines BL1 to BLm to float. In embodiments, the read and write circuit 123 may include a column select circuit.

The data input/output circuit 124 is coupled to the first to m-th page buffers PB1 to PBm through the data lines DL. The data input/output circuit 124 is operated under the control of the control logic 130.

The data input/output circuit 124 may include a plurality of input/output buffers (not illustrated) which receive input data DATA. During a program operation, the data input/output circuit 124 receives the data DATA to be stored from an external controller (not illustrated). During a read operation, the data input/output circuit 124 outputs the data DATA, received from the first to m-th page buffers PB1 to PBm included in the read and write circuit 123, to the external controller.

During a read operation or a verify operation, the sensing circuit 125 may generate a reference current in response to an enable bit signal VRYBIT generated by the control logic 130, and may output a pass signal or a fail signal to the control logic 130 by comparing a sensing voltage VPB received from the read and write circuit 123 with a reference voltage generated by the reference current.

The control logic 130 may be coupled to the address decoder 121, the voltage generator 122, the read and write circuit 123, the data input/output circuit 124, and the sensing circuit 125. The control logic 130 may control the overall operation of the memory device 100. The control logic 130 may be operated in response to a command CMD transmitted from an external device.

The control logic 130 may control the peripheral circuit 120 by generating various types of signals in response to the command CMD and the addresses ADDR. For example, the control logic 130 may generate an operation signal OPSIG, a row address RADD, read and write circuit control signals PBSIGNALS, and the enable bit VRYBIT in response to the command CMD and the addresses ADDR. The control logic 130 may output the operation signal OPSIG to the voltage generator 122, output the row address RADD to the address decoder 121, output the page buffer control signal PBSIGNALS to the read and write circuit 123, and output the enable bit VRYBIT to the sensing circuit 125. In addition, the control logic 130 may determine whether a verify operation has passed or failed in response to the pass or fail signal PASS or FAIL output from the sensing circuit 125.

Figure 3:
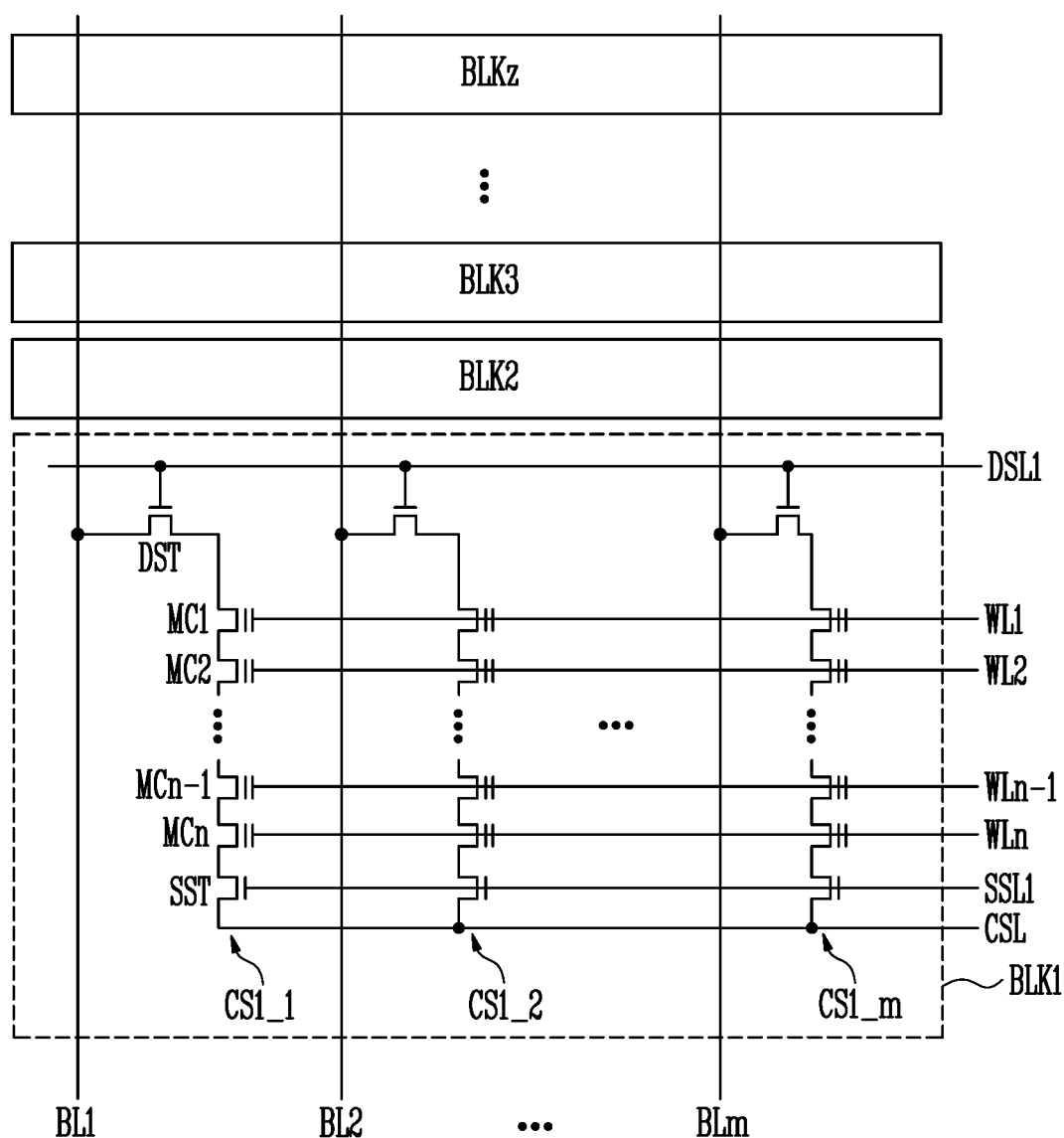
FIG. 3 is a diagram illustrating a memory cell array 110 of FIG. 2 according to an embodiment of the present disclosure.

FIG. 3 is a diagram illustrating a memory cell array 110 of FIG. 2 according to an embodiment of the disclosure.

Referring to FIG. 3, the first to z-th memory blocks BLK1 to BLKz are coupled in common to the first to m-th bit lines BL1 to BLm. In FIG. 3, for convenience of description, elements included in the first memory block BLK1, among the plurality of memory blocks BLK1 to BLKz, are illustrated, and illustration of elements included in each of the remaining memory blocks BLK2 to BLKz is omitted. It will be understood that each of the remaining memory blocks BLK2 to BLKz has the same configuration as the first memory block BLK1.

The memory block BLK1 may include a plurality of cell strings CS1_1 to CS1_m (where m is a positive integer). The first to m-th cell strings CS1_1 to CS1_m are respectively coupled to the first to m-th bit lines BL1 to BLm. Each of the first to m-th cell strings CS1_1 to CS1_m may include a drain select transistor DST, a plurality of memory cells MC1 to MCn (where n is a positive integer) which are coupled in series to each other, and a source select transistor SST.

A gate terminal of the drain select transistor DST included in each of the first to m-th cell strings CS1_1 to CS1_m is coupled to a drain select line DSL1. Gate terminals of the first to n-th memory cells MC1 to MCn included in each of the first to m-th cell strings CS1_1 to CS1_m are coupled to first to n-th word lines WL1 to WLn, respectively. A gate terminal of the source select transistor SST included in each of the first to m-th cell strings CS1_1 to CS1_m is coupled to a source select line SSL1.

For convenience of description, the structure of each cell string will be described based on the first cell string CS1_1, among the plurality of cell strings CS1_1 to CS1_m. However, it will be understood that each of the remaining cell strings CS1_2 to CS1_m is configured in the same or substantially the same manner as the first cell string CS1_1.

A drain terminal of the drain select transistor DST included in the first cell string CS1_1 is coupled to the first bit line BL1. A source terminal of the drain select transistor DST included in the first cell string CS1_1 is coupled to a drain terminal of the first memory cell MC1 included in the first cell string CS1_1. The first to n-th memory cells MC1 to MCn may be coupled in series to each other. A drain terminal of the source select transistor SST included in the first cell string CS1_1 is coupled to a source terminal of the n-th memory cell MCn included in the first cell string CS1_1. A source terminal of the source select transistor SST included in the first cell string CS1_1 is coupled to a common source line CSL. In an embodiment, the common source line CSL may be coupled in common to the first to z-th memory blocks BLK1 to BLKz.

The drain select line DSL1, the first to n-th word lines WL1 to WLn, and the source select line SSL1 are included in the row lines RL of FIG. 2. The drain select line DSL1, the first to n-th word lines WL1 to WLn, and the source select line SSL1 are controlled by the address decoder 121. The common source line CSL is controlled by the control logic 130. The first to m-th bit lines BL1 to BLm are controlled by the read and write circuit 123.

Figure 4:
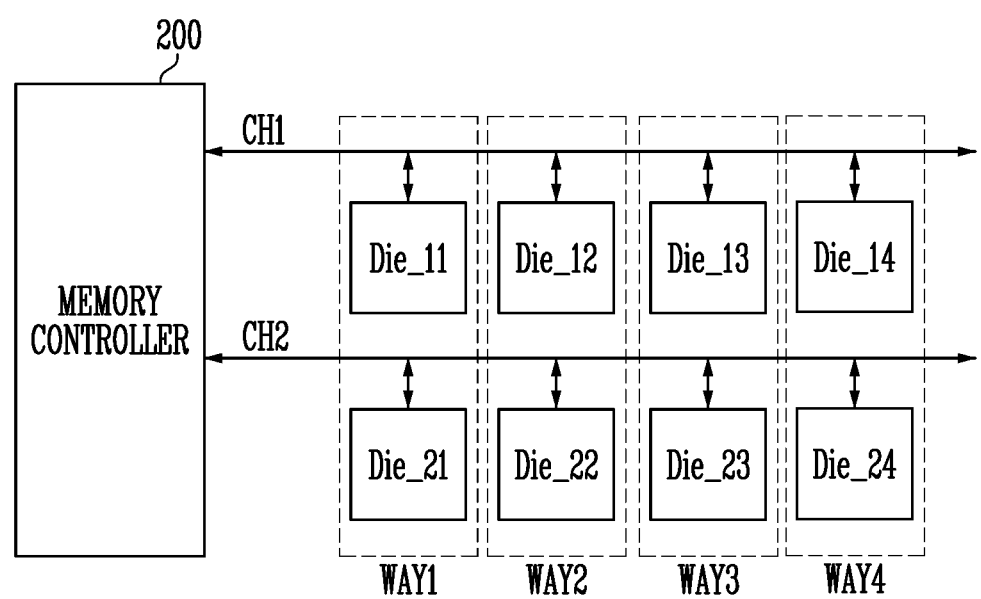
FIG. 4 is a diagram illustrating a scheme in which a memory controller controls a plurality of memory devices according to an embodiment of the present disclosure.

FIG. 4 is a diagram illustrating a scheme in which a memory controller controls a plurality of memory devices according to an embodiment of the disclosure.

Referring to FIG. 4, the memory controller 200 may be coupled to a plurality of memory devices Die_11 to Die_14 and Die_21 to Die_24 through a first channel CH1 and a second channel CH2, respectively. The number of channels and the number of memory devices coupled to each channel in FIG. 4 are exemplary and embodiments contemplated by the disclosure are not limited thereto.

The memory devices Die_11 to Die_14 may be coupled to the first channel CH1. The memory devices Die_11 to Die_14 may communicate with the memory controller 200 through the first channel CH1.

Because the memory devices Die_11 to Die_14 are coupled to the first channel CH1, only one memory device may communicate with the memory controller 200 at a time. However, internal operations performed in respective memory devices Die_11 to Die_14 may be simultaneously performed.

The memory devices Die_21 to Die_24 may be coupled to the second channel CH2. The memory devices Die_21 to Die_24 may communicate with the memory controller 200 through the second channel CH2.

Because the memory devices Die_21 to Die_24 are coupled in common to the second channel CH2, only one memory device may communicate with the memory controller 200 at a time. Internal operations may be simultaneously performed in respective memory devices Die_21 to Die_24.

A storage device that uses a plurality of memory devices may improve performance using data interleaving, which is data communication using an interleaving scheme. Data interleaving may be configured to perform a data read or write operation while shifting or alternating each way in a structure, in which two or more ways share one channel, with each other. For data interleaving, the memory devices may be managed on a way-by-way basis together with channels. In order to maximize the parallelism of memory devices coupled to each channel, the memory controller 200 may distribute and allocate consecutive logical memory areas to channels and ways.

For example, the memory controller 200 may transmit control signals, including a command and an address, and data to the memory device Die_11 through the first channel CH1. While the memory device Die_11 is programming the received data to its memory cells, the memory controller 200 may transmit control signals, including a command and an address, and data to the memory device Die_12.

In FIG. 4, the plurality of memory devices may constitute four ways WAY1 to WAY4. The first way WAY1 may include the memory devices Die_11 and Die_21. The second way WAY2 may include the memory devices Die_12 and Die_22. The third way WAY3 may include the memory devices Die_13 and Die_23. The fourth way WAY4 may include the memory devices Die_14 and Die_24.

Each of the channels CH1 and CH2 may be a bus for signals, which is shared and used by memory devices coupled to the corresponding channel.

Although, in FIG. 4, data interleaving in a 2-channel/4-way structure is illustrated, interleaving may be more efficient as the number of channels increases and the number of ways increases.

Figure 5:
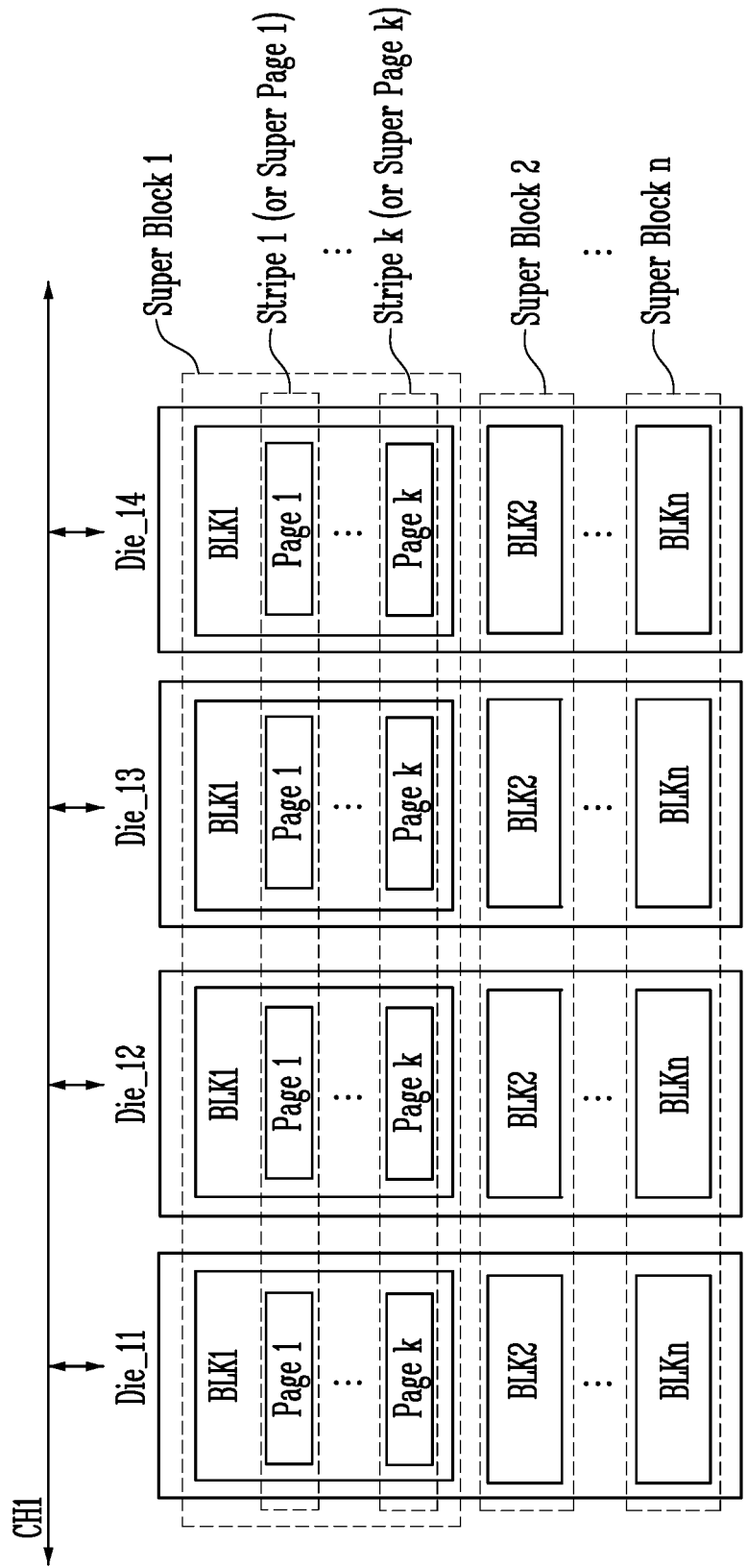
FIG. 5 is a diagram illustrating a super block according to an embodiment of the present disclosure.

FIG. 5 is a diagram illustrating a super block according to an embodiment of the disclosure.

Referring to FIG. 5, memory devices Die_11 to Die_14 may be coupled in common to a first channel CH1.

Referring to FIG. 5, each memory device may include multiple planes. However, for convenience of description, it is assumed that one memory device includes one plane. One plane may include a plurality of memory blocks BLK1 to BLKn (where n is a natural number of 1 or more), and one memory block may include a plurality of pages Page 1 to Page k (where k is a natural number of 1 or more).

The memory controller may control memory blocks, which are included in a plurality of memory devices coupled to a channel, on a super block basis. In other words, a super block may include at least two memory blocks included in different memory devices connected to a common channel.

For example, the first memory blocks BLK1 included in respective memory devices Die_11 to Die_14 may constitute a first super block (Super Block 1). The second memory blocks BLK2 included in respective memory devices Die_11 to Die_14 may constitute a second super block (Super Block 2). Similarly, n-th memory blocks BLKn included in respective memory devices Die_11 to Die_14 may constitute an n-th super block (Super Block n). Therefore, the memory devices Die_11 to Die_14 coupled to the first channel CH1 may include the first to n-th super blocks (Super block 1 to Super Block n).

A super block may have a plurality of stripes. The term "stripe" may be used interchangeably with the term "super page".

One stripe or super page may include a plurality of pages. For example, first pages (Page 1), which are respectively included in each of the plurality of first memory blocks BLK1 that are part of the first super block (Super Block 1), may constitute a first stripe (Stripe 1) or a first super page (Super page 1).

Therefore, one super block may include a first stripe (Stripe 1) to a k-th stripe (Stripe k). Put another way, one super block may include a first super page (Super Page 1) to a k-th super page (Super Page k).

The memory controller may store or read data on a stripe basis or a super page basis when storing or reading data in the memory devices Die_11 to Die_14.

In various embodiments, each super block may include memory blocks which store different numbers of data bits. For example, first memory blocks BLK1 included in the memory devices Die_11 and Die_12 may be SLC blocks, in which each memory cell stores one data bit. The first memory blocks BLK1 included in the memory devices Die_13 and Die_14 may be MLC blocks, in which each memory cell stores two data bits. In this case, a super block may be configured in a form in which SLC blocks and MLC blocks are combined with each other.

Figure 6:
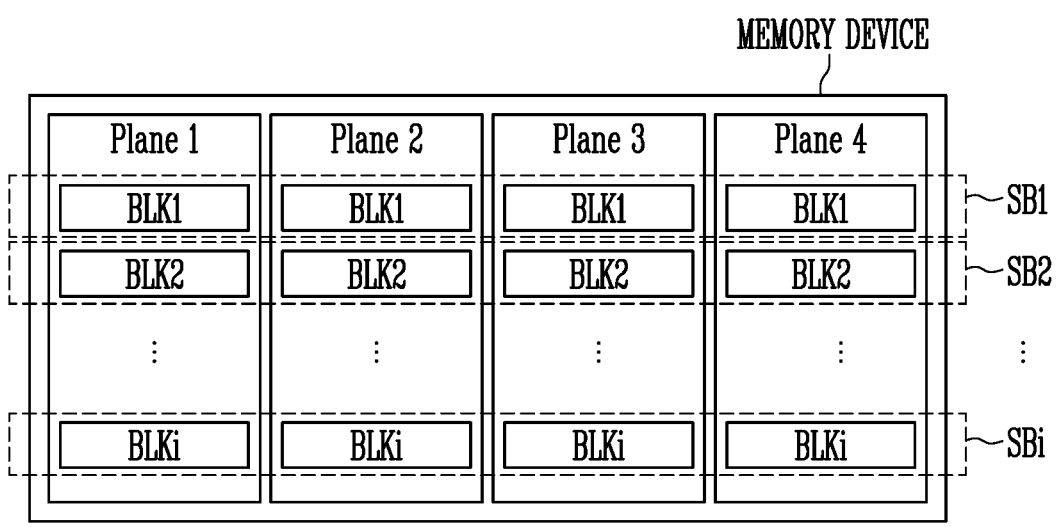
FIG. 6 is a diagram illustrating a super block according to an embodiment of the present disclosure.

FIG. 6 is a diagram illustrating a super block according to an embodiment of the disclosure.

Referring to FIG. 6, a memory device may include multiple planes (Plane 1 to Plane 4). One plane may include a plurality of memory blocks BLK1 to BLKi (where i is a positive integer).

The number of planes included in a memory device as illustrated in FIG. 6 is exemplary and embodiments contemplated by the disclosure are not limited thereto.

A plane may be a unit by which a program operation, a read operation or an erase operation is independently performed. Therefore, each memory device may include an address decoder 121 and a read and write circuit 123, such as those described above and with reference to FIG. 2, for each plane.

In an embodiment, a super block may include at least two memory blocks included in different planes from among memory blocks included in multiple planes.

For example, the first memory blocks BLK1 in each of Plane 1 through Plane 4 may constitute a first super block SB1. The second memory blocks BLK2 of Plane 1 through Plane 4 may constitute a second super block SB2. Similarly, i-th memory blocks BLKi respectively included in the multiple planes (Plane 1 through Plane 4) may constitute an i-th super block SBi. Therefore, each of the multiple planes (Plane 1 to Plane 4) included in one memory device may include at least a portion of the first to i-th super blocks SB1 to SBi.

Each super block that spans Planes 1 through Plane 4 may include a plurality of stripes (or super pages) similar to those described above and with reference to FIG. 5. The memory controller may store or read data on a stripe-by-strip basis or a super page-by-page basis when storing or reading data in the multiple planes (Plane 1 to Plane 4). In other words, the memory device may perform multiple plane operations (i.e., multi-plane operation) on the multiple planes (Plane 1 to Plane 4) in parallel.

FIGS. 7A to 7C are diagrams illustrating data storage schemes according to the number of data bits stored in a memory cell according to embodiments of the present disclosure.

Referring to FIGS. 7A to 7C, a horizontal axis of each graph indicates the magnitude of a threshold voltage and a vertical axis of each graph indicates the number of memory cells.

Respective graphs in FIGS. 7A to 7C will be described on the assumption that the number of data bits stored in one memory cell ranges from 1 to 3. However, the number of data bits stored in one memory cell in FIGS. 7A through 7C are exemplary and embodiments contemplated by the disclosure are not limited thereto.

The graph in FIG. 7A shows a threshold voltage distribution of a single-level cell (SLC) in which one data bit is stored in one memory cell. The single-level cell may have or be in a state corresponding to any one of an erased state E and a programmed state P1.

A read voltage Va1 may be a read voltage for distinguishing the erased state E from the programmed state P1. When the single-level cell having the erased state E is read using the read voltage Va1, it may be read as an ON cell. The ON cell may correspond to a logical value of '1'. When the single-level cell having the programmed state P1 is read using the read voltage Va1, it may be read as an OFF cell. The OFF cell may correspond to a logical value of '0'.

The graph in FIG. 7B shows a threshold voltage distribution of a multi-level cell (MLC) in which two data bits are stored in one memory cell. The multi-level cell may have or be in a state corresponding to any one of four states: the erased state E and first to third programmed states P1 to P3.

First to third read voltages Vb1 to Vb3 may be read voltages for distinguishing the erased state E and the first to third programmed states P1 to P3 from each other. For example, the first read voltage Vb1 may be a read voltage for distinguishing the erased state E from the first programmed state P1. The second read voltage Vb2 may be a read voltage for distinguishing the first programmed state P1 from the second programmed state P2. The third read voltage Vb3 may be a read voltage for distinguishing the second programmed state P2 from the third programmed state P3.

The multi-level cell may be identified as being in a state corresponding to the erased state E or any one of the first to third programmed states P1 to P3 based on the result of reading using the first to third read voltages Vb1 to Vb3.

The erased state E and the first to third programmed states P1 to P3 may correspond to pieces of logical data '11', '01', '00', and '10', respectively. The number of pieces of logical data and the number of corresponding to respective states in FIGS. 7A through 7C are exemplary and embodiments contemplated by the disclosure are not limited thereto.

Logical pages corresponding to word lines coupled to the multi-level cells may be a Most Significant Bit (MSB) page and a Least Significant Bit (LSB) page, respectively. The MSB page may be a page which stores the MSB of the two data bits stored in each multi-level cell. The LSB page may be a page which stores the LSB of the two data bits stored in each multi-level cell.

Since the multi-level cell is programmed to have a state corresponding to any one of the erased state E and the programmed states P1 to P3, the multi-level cell and the single-level cell have different data storage schemes.

The graph in FIG. 7C shows a threshold voltage distribution of a triple-level cell (TLC) in which three data bits are stored in one memory cell. The triple-level cell may have a state corresponding to any one of an erased state E and first to seventh programmed states P1 to P7.

First to seventh read voltages Vc1 to Vc7 may be read voltages for distinguishing the erased state E and the first to seventh programmed states P1 to P7 from each other. The first read voltage Vc1 may be a read voltage for distinguishing the erased state E from the first programmed state P1. The second read voltage Vc2 may be a read voltage for distinguishing the first programmed state P1 from the second programmed state P2, and so on. Thus, the seventh read voltage Vc7 may be a read voltage for distinguishing the sixth programmed state P6 from the seventh programmed state P7.

The triple-level cell may be identified as being in a state corresponding to the erased state E or any one of the first to seventh programmed states P1 to P7 based on the result of reading using the first to seventh read voltages Vc1 to Vc7.

The erased state E and the first to seventh programmed states P1 to P7 may correspond to pieces of logical data '111', '110', '100', '000', '010', '011', '001', and '101', respectively. The number of pieces of logical data corresponding to respective states in FIGS. 7A through 7C are exemplary and embodiments contemplated by the disclosure are not limited thereto.

Logical pages corresponding to word lines coupled to triple-level cells may be an MSB page, a Central Significant Bit (CSB) page, and an LSB page, respectively. The MSB page may be a page which stores the MSB of three data bits stored in each triple-level cell. The CSB page may be a page which stores the CSB of three data bits stored in each triple-level cell. The LSB page may be a page which stores the LSB of three data bits stored in each triple-level cell.

Because a triple-level cell is programmed to have a state corresponding to any one of the erased state E and programmed states P1 to P7, the triple-level cell, the single-level cell, and the multi-level cell have different data storage schemes. That is, even in the same memory cell, the memory cell may be identified as a single-level cell, a multi-level cell or a triple-level cell according to the data storage scheme.

As the number of data bits stored in each memory cell increases, the number of erased and programmed states that the memory cell can have may increase. Therefore, as the number of states that the memory cell can have increases, the number of times that the memory cell is read using a read voltage for distinguishing two adjacent states from each other in a read operation may increase. As the number of states that the memory cell can have increases, the number of times that a program voltage corresponding to each state is applied in a program operation may increase.

Therefore, the speed of the read operation and the speed of the program operation may increase from a speed of a triple-level cell, an operation speed of a multi-level cell, and an operation speed of a single-level cell.

FIG. 8 is a diagram illustrating a configuration and operation of a memory controller of FIG. 1 according to an embodiment of the present disclosure.

Referring to FIG. 8, the memory controller 200 may include a storage area manager 210 and a write operation controller 220.

The storage area manager 210 may allocate a plurality of memory devices 100 to first and second groups, according to a data storage scheme, in response to a storage area setting command received from a host 300. The data storage scheme may be classified based on the number of data bits stored in each memory cell included in each memory device. In various embodiments, the storage area manager 210 may allocate a plurality of memory devices 100 to at least two groups.

For example, each of memory devices in a first group may include memory blocks, each storing n data bits (where n is a natural number of 1 or more). Each of memory devices in a second group may include memory blocks, each storing m data bits (where m is different from n).

In an embodiment, m may be greater than n. In this case, because the number of data bits stored in each memory cell of the memory devices in the first group is less than the number of data bits stored in each memory cell that of the memory devices in the second group, the speed of a data write operation in the first group may be higher than the speed of a data write operation in the second group, as illustrated in FIGS. 7A to 7C.

In other embodiments, some of the memory devices in a second group may include memory blocks, each storing m data bits, and others in the second group may include memory blocks, each storing n data bits. When a super block is configured using memory blocks included in the memory devices in the second group, the corresponding super block may be configured to have both memory blocks storing n data bits, in which a data write operation is performed at high speed (i.e., fast write), and memory blocks storing m data bits, in which a data write operation is performed at normal speed (i.e., normal writing).

The storage area setting command received from the host 300 may include a size information of a storage area in which data corresponding to fast write is stored. The storage area setting command may include a command (i.e., a logical unit configuration command) received from the host 300 so as to partition the entire storage area of the plurality of memory devices 100.

The storage area manager 210 may adjust the number of memory devices allocated to the first group based on the ratio of the storage area in which data corresponding to fast write will be stored, to the entire storage area of the plurality of memory devices 100.

As the ratio, of the storage area (in which data corresponding to fast write to the entire storage area is stored) increases, the storage area manager 210 may increase the number of memory devices to be allocated to the first group from among the plurality of memory devices 100. The speed of data writing in the memory devices in the first group may be higher than that of data writing in the memory devices in the second group.

In various embodiments, the storage area manager 210 may adjust the number of memory devices to be allocated to the first group based on the result of comparing a ratio, of the storage area in which data corresponding to fast write operation will be stored to the entire storage area, with a threshold ratio. A detailed description thereof will be described later with reference to FIG. 12.

The storage area manager 210 may allocate super blocks, as described above with reference to FIG. 5. For example, the storage area manager 210 may allocate at least two memory blocks included in different memory devices, among the memory devices included in the first group, as a first super block. The storage area manager 210 may allocate at least two memory blocks included in different memory devices, among the memory devices included in the second group, as a second super block in response to the type of request.

In an embodiment, the storage area manager 210 may allocate super blocks, as described above with reference to FIG. 6.

The storage area manager 210 may allocate at least two memory blocks included in different planes, among a plurality of planes included in a memory device selected from the first group, as a first super block. The storage area manager 210 may allocate at least two memory blocks included in different planes, among a plurality of planes included in a memory device selected from the second group, as a second super block.

After allocating the plurality of memory devices 100 to the first group and the second group, the storage area manager 210 may generate storage area management information that indicates which memory devices are included in the first group and the second group, respectively.

The generated storage area management information may be stored in various manners in the plurality of memory devices 100. In detail, the storage area management information may be metadata, which may be stored in system blocks included in the plurality of memory devices 100. Alternatively, the storage area management information may be stored in spare areas between user areas of the memory blocks included in the plurality of memory devices 100.

After the storage area management information has been generated and stored in a storage device 50 (described above and with reference to FIG. 1), at the time of boot up, the storage area manager 210 may receive the storage area management information from the plurality of memory devices 100. After the storage area management information has been generated, the storage area manager 210 may allocate the plurality of memory devices 100 to the first group and the second group based on the received storage area management information.

The storage area manager 210 may provide the generated storage area management information to the write operation controller 220. The write operation controller 220 may determine or select, based on the provided storage area management information, the first group and the second group to which each of the plurality of memory devices 100 is allocated.

The write operation controller 220 may provide write data and a write command, corresponding to a write request received from the host 300, to the plurality of memory devices 100.

The write operation controller 220 may provide the write data and the write command, corresponding to the write request, to memory devices included in any one of the first group and the second group according to the type of the write request. The type of the write request may be a fast write request or a normal write request. The number of types of the write request is not limited to fast and normal requests, embodiments contemplated by the disclosure are not limited thereto.

In various embodiments, the type of the write request may be sub-divided into two or more types. A write command may be a command for instructing the write data to be stored in any one of a first super block corresponding to the first group and a second super block corresponding to the second group.

The write operation controller 220 may determine the type of the write request based on flag information included in the write request from the host 300. The flag information may indicate whether the write request received from the host 300 is a fast write request or a normal write request. For example, when the flag information includes a logical data value of '1', the write request may be the fast write request, and when the flag information includes a logical data value of '0', the write request may be the normal write request.

When the write request is the fast write request, the write operation controller 220 may provide the write data and the write command to memory devices included in a first group.

The write operation controller 220 may control an operation of programming the write data according to the interleaving scheme, described above with reference to FIG. 4. The write operation controller 220 may provide the write command to the memory devices included in the first group instructing the write data to be stored in a first super block.

When the write request is the normal write request, the write operation controller 220 may provide the write data and the write command to memory devices included in a second group. The write operation controller 220 may provide a write command to the memory devices included in the second group for instructing the write data to be stored in a second super block.

Figure 9:
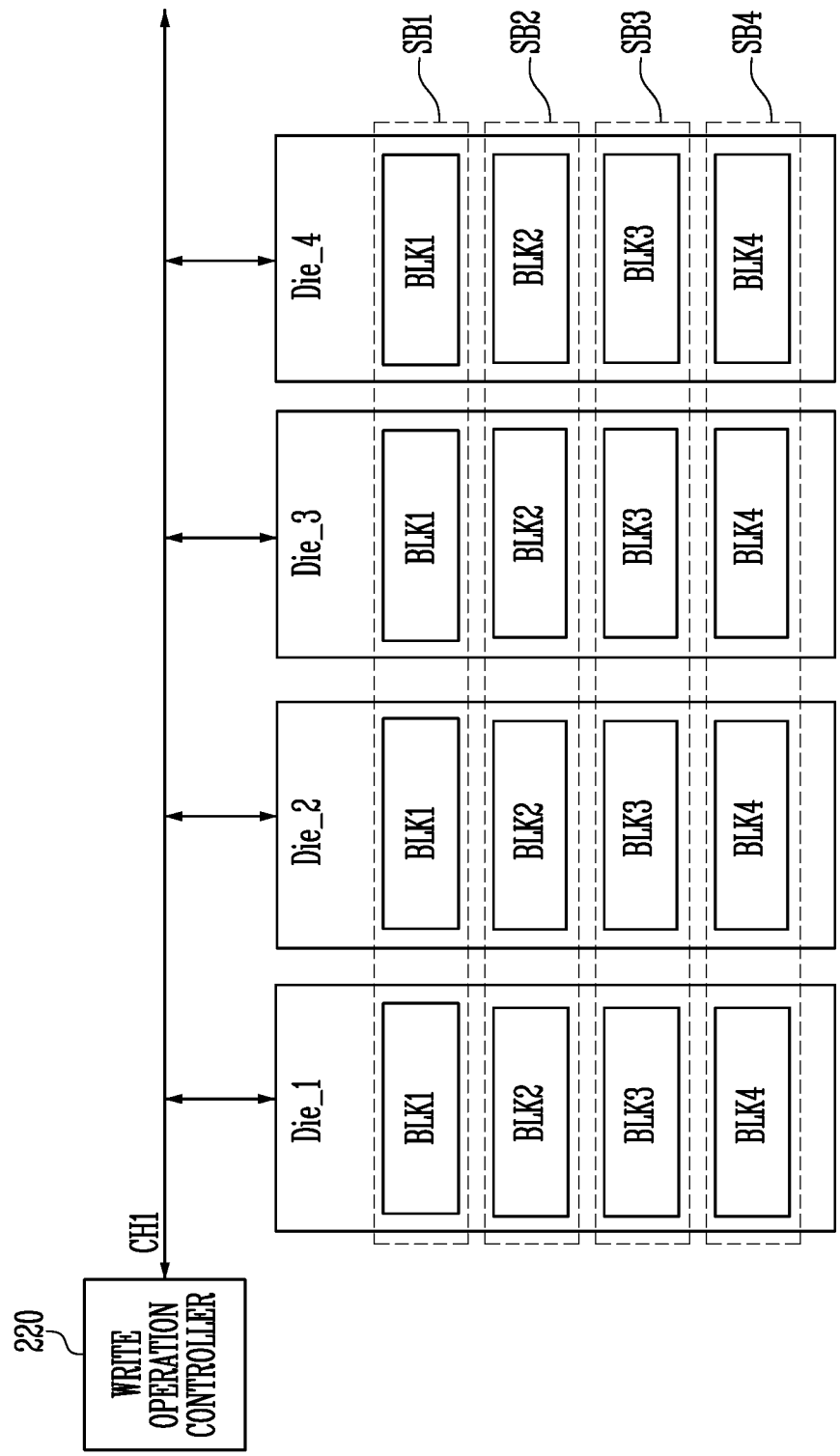
FIG. 9 is a diagram illustrating a scheme for allocating super blocks according to an embodiment of the present disclosure.

FIG. 9 is a diagram illustrating a scheme for allocating super blocks according to an embodiment of the disclosure.

Referring to FIG. 9, it is assumed that each of memory devices includes first to fourth memory blocks BLK1 to BLK4. The number of memory blocks included in each memory device in FIG. 9 are exemplary and embodiments contemplated by the disclosure are not limited thereto.

In FIG. 9, memory devices Die_1 to Die_4 may include portions of super blocks SB1 to SB4. Each super block may include memory blocks included in different memory devices.

For example, the super block SB1 may include first memory blocks BLK1 respectively included in the memory devices Die_1 to Die_4. The super block SB2 may include second memory blocks BLK2 respectively included in the memory devices Die_1 to Die_4. The super block SB3 may include third memory blocks BLK3 respectively included in the memory devices Die_1 to Die_4. The super block SB4 may include fourth memory blocks BLK4 respectively included in the memory devices Die_1 to Die_4.

In an embodiment, the write operation controller 220 may store data in the memory devices Die_1 to Die_4 on a super block basis. Therefore, for example, when super blocks are configured using all of the memory devices Die_1 to Die_4, a program operation storing data in the super block SB2 cannot be performed until a program operation storing data in the super block SB1 is completed.

Figure 10:
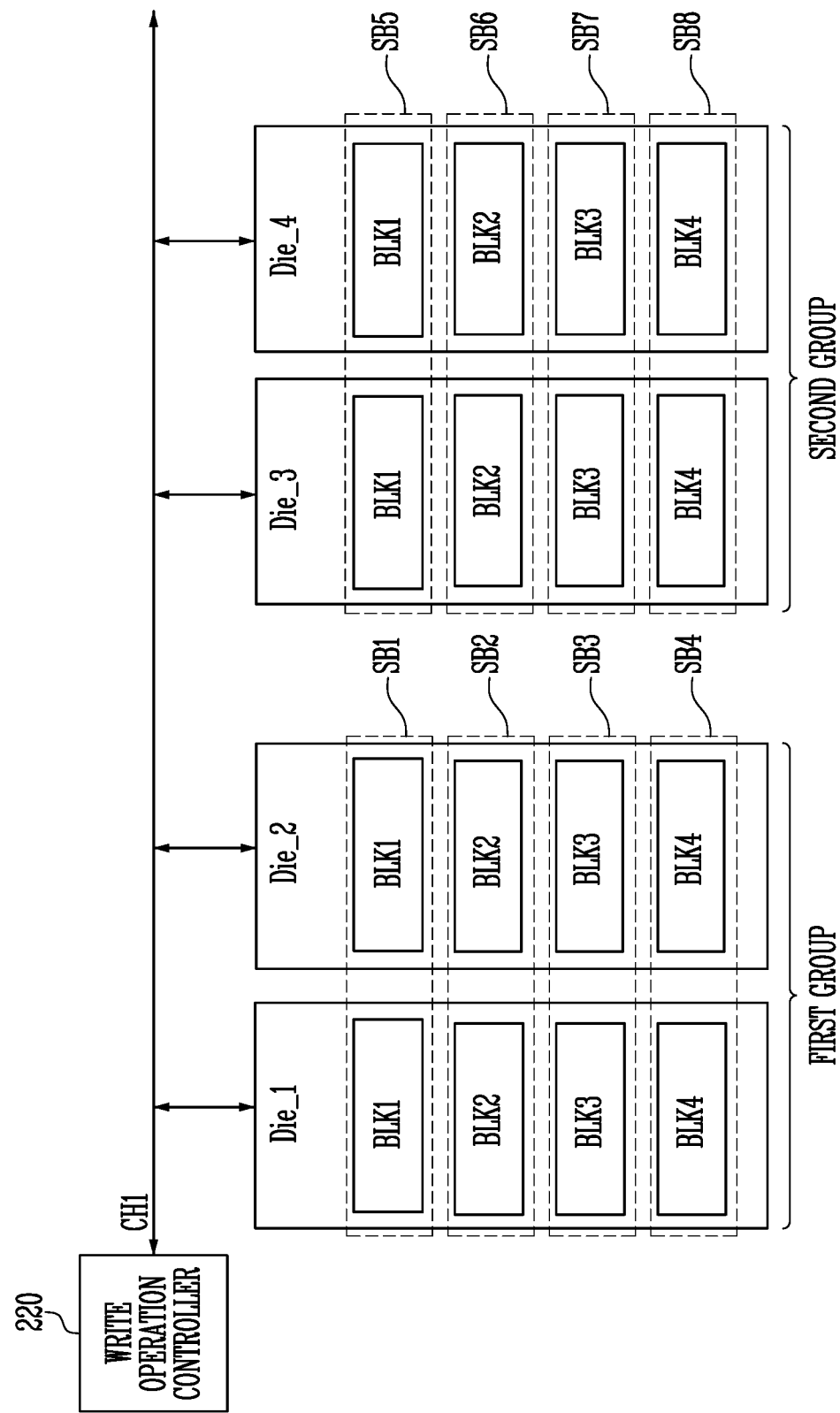
FIG. 10 is a diagram illustrating a scheme for allocating super blocks according to an embodiment of the present disclosure.

FIG. 10 is a diagram illustrating a scheme for allocating super blocks according to an embodiment of the present disclosure.

Referring to FIG. 10, it is assumed that each of memory devices includes first to fourth blocks BLK1 to BLK4. The number of memory blocks included in each memory device in FIG. 10 are exemplary and embodiments contemplated by the disclosure are not limited thereto.

In FIG. 10, memory devices Die_1 and Die_2 in a first group may include portions of super blocks SB1 to SB4. Memory devices Die_3 and Die_4 in a second group may include portions of super blocks SB5 to SB8.

For example, the super block SB1 may include first memory blocks BLK1 respectively included in the memory devices Die_1 and Die_2. The super block SB2 may include second memory blocks BLK2 respectively included in the memory devices Die_1 and Die_2. The super block SB3 may include third memory blocks BLK3 respectively included in the memory devices Die_1 and Die_2. The super block SB4 may include fourth memory blocks BLK4 respectively included in the memory devices Die_1 and Die_2.

The super block SB5 may include first memory blocks BLK1 respectively included in the memory devices Die_3 and Die_4. The super block SB6 may include second memory blocks BLK2 respectively included in the memory devices Die_3 and Die_4. The super block SB7 may include third memory blocks BLK3 respectively included in the memory devices Die_3 and Die_4. The super block SB8 may include fourth memory blocks BLK4 respectively included in the memory devices Die_3 and Die_4.

In an embodiment, the write operation controller 220 may store data in the memory devices Die_1 to Die_4 on a super block basis. As compared with an embodiment of FIG. 9, the memory devices Die_1 and Die_2 included in the first group and the memory devices Die_3 and Die_4 included in the second group have different super blocks. Therefore, a program operation of storing data in the super block SB5, for example, may be performed while a program operation of storing data in the super block SB1 is also performed.

In an embodiment, as described above with reference to FIG. 10, the speed of a data write operation in the memory devices Die_1 and Die_2 in the first group may be higher than that of the memory devices Die_3 and Die_4 in the second group.

In another embodiment, the speed of the data write operation in the memory devices Die_1, Die_2, and Die_3 may be higher than that of the memory device Die_4. The first group may be configured using only the memory devices Die_1 and Die_2 having a higher data write operation speed. The second group may be configured such that the memory device Die_3, having a high data write operation speed, and the memory device Die_4, having a normal data write operation speed, are combined with each other.

In response to the write request received from the host 300, described above with reference to FIG. 8, write operation controller 220 may selectively provide write data and a write command, corresponding to the write request, to memory devices included in any one of the first group and the second group.

For example, when the write request is a fast write request, the write operation controller 220 may provide the write data and the write command to the memory devices Die_1 and Die_2 included in the first group. The write data may be stored in any one of the first super blocks SB1 to SB4 corresponding to the first group.

When the write request is a normal write request, the write operation controller 220 may provide the write data and the write command to the memory devices Die_3 and Die_4 included in the second group. The write data may be stored in any one of the second super blocks SB5 to SB8 corresponding to the second group.

As compared with the embodiment of FIG. 9, FIG. 10 shows that groups can be divided according to a data storage scheme (i.e., the number of data bits stored in each memory cell). Thus a program operation requiring a fast write operation and a program operation requiring normal write speed operation may be respectively and independently performed by memory cells in memory devices allocated to different groups.

Therefore, while a program operation for data requiring any one of fast write and normal write is performed, a program operation for data requiring another type of write operation may also be performed, and thus a write amplification index (WAI) may be improved.

FIG. 11 is a diagram illustrating storage area management information of FIG. 10 according to an embodiment of the present disclosure.

Referring to FIG. 11, the storage area management information may indicate memory devices respectively included in a first group and a second group from among a plurality of memory devices that are coupled to each other by a channel.

In an embodiment, each of memory devices Die_1 and Die_2 in the first group may include memory blocks, each of which includes memory cells, each storing n data bits (where n is a natural number of 1 or more). Each of memory devices Die_3 and Die_4 in a second group may include memory blocks, each of which includes memory cells, each storing m data bits (where m is greater than n). Therefore, the speed of a data write operation in the memory devices (Die_1 and Die_2) in the first group may be higher than that of the memory devices (Die_3 and Die_4) in the second group.

The storage area management information may be stored in the plurality of memory devices Die_1 to Die_4 in various manners. In detail, the storage area management information, which is metadata, may be stored in system blocks included in the plurality of memory devices Die_1 to Die_4. Alternatively, the storage area management information may be stored in spare areas between user areas of the memory blocks included in the plurality of memory devices Die_1 to Die_4.

The stored storage area management information may be provided to the memory controller 200 when the storage device 50, described above with reference to FIG. 1, boots up. The memory controller 200 may allocate the plurality of memory devices Die_1 to Die_4 to the first group and the second group based on the received storage area management information.

Figure 12:
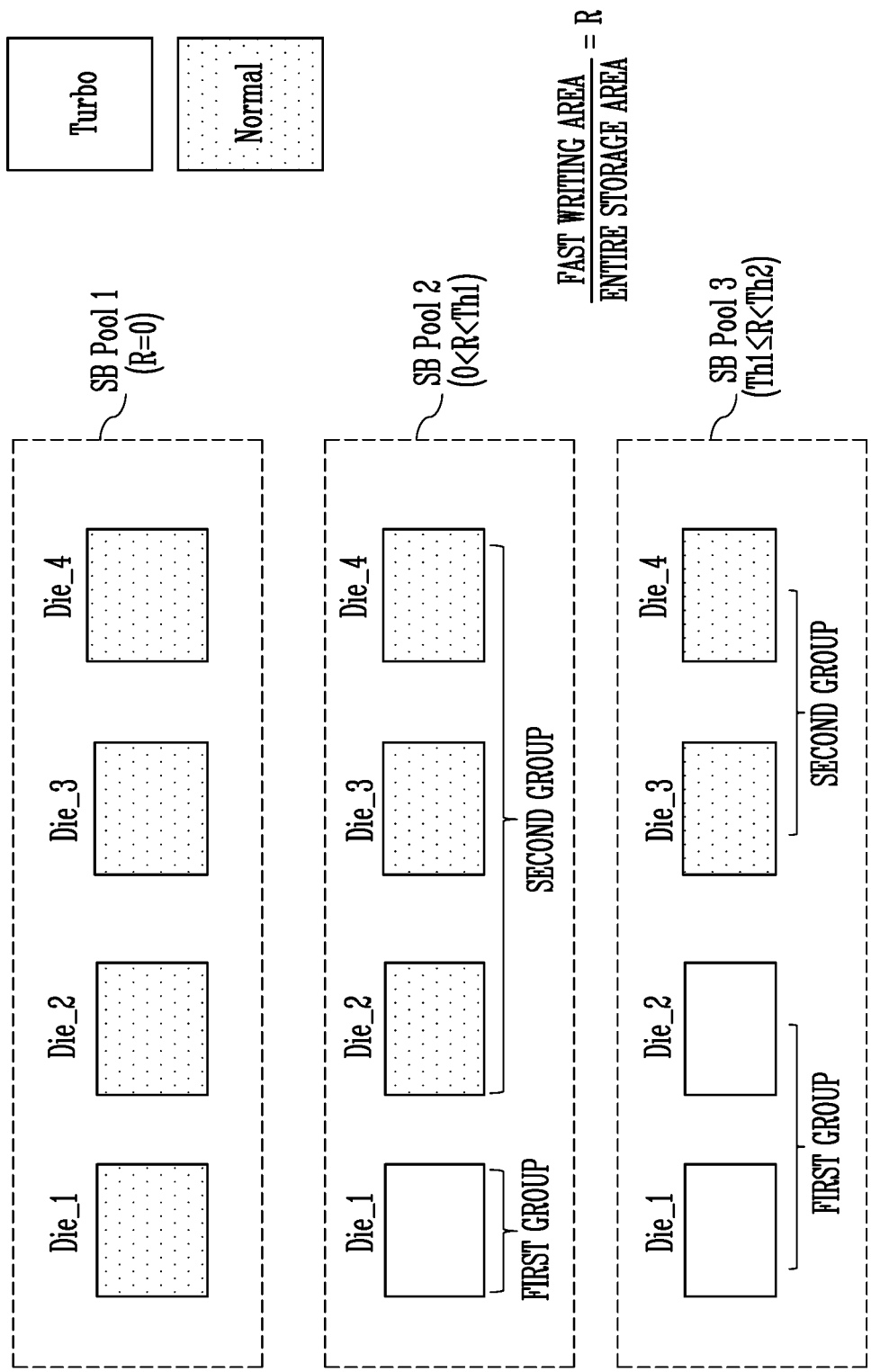
FIG. 12 is a diagram illustrating a method of adjusting a super block allocation ratio according to an embodiment of the present disclosure.

FIG. 12 is a diagram illustrating a method of adjusting a super block allocation ratio according to an embodiment of the present disclosure.

Referring to FIG. 12, the number of memory devices Die_1 to Die_4 coupled in common to a memory controller through one channel may be 4. The number of memory devices coupled in common to the memory controller through a single channel in FIG. 12 are exemplary and embodiments contemplated by the disclosure are not limited thereto.

In FIG. 12, memory devices indicated by dotted boxes may be normal memory devices for normal writing operations. Memory devices indicated by blank, non-dotted boxes may be turbo-memory devices for fast write operations. The turbo-memory devices for fast write may be memory devices allocated to the first group, described above with reference to FIG. 8. The normal memory devices for normal writing may be memory devices allocated to the second group.

In various embodiments, a memory device, which includes memory blocks, each storing n data bits, may be a turbo-memory device for fast write operations. A memory device, which includes memory blocks, each storing m data bits (where m is greater than n), may be a normal memory device for normal writing operations. A turbo-memory device for fast write operations may be allocated to a first group. A normal memory device for normal writing operations may be allocated to a second group. Alternatively, a combination of a turbo-memory device for fast write operations and a normal memory device for normal writing operations may be allocated to the second group.

Because only the turbo-memory devices for fast write operations are allocated to the first group, and both turbo-memory devices for fast write operations and normal memory devices for normal writing operations are allocated to the second group, a data write operation on a super block that is configured using memory devices included in the first group may be performed faster than a data write operation on a super block that is configured using both kinds of memory devices included in the second group.

A super block pool (SB Pool) may be determined based on the size information of a storage area in which data corresponding to fast write, received from the host, is stored. The number of memory devices to be included in the first group may be adjusted according to the ratio R of the storage area, in which data corresponding to fast write is stored, to the entire storage area (write area) of all memory devices.

For example, referring to the SB Pool 1 of FIG. 12, when the ratio R is 0, that is, when the host does not request a separate storage area for fast write, the number of memory devices allocated to the first group may be '0'. Here, the number of memory devices included in the second group may be '4', which is the total number of memory devices Die_1 to Die_4. In a first super block pool (SB Pool 1), a super block may be configured using all of the memory devices Die_1 to Die_4.

When the ratio R is greater than 0 and is less than a first threshold ratio Th1, the number of memory devices allocated to the first group may be '1', which is the number of memory device Die_1. The number of memory devices included in the second group may be '3', which is the number of memory devices Die_2 to Die_4. In a second super block pool (SB Pool 2), the memory device Die_1 of the first group and the memory devices Die_2 to Die_4 of the second group may separately configure their respective super blocks.

When the ratio R is equal to or greater than the first threshold ratio Th1 and is less than a second threshold ratio Th2, the number of memory devices allocated to the first group may be '2', which is the number of memory devices Die_1 and Die_2. The number of memory devices included in the second group may be '2', which is the number of memory devices Die_3 and Die_4. Therefore, in a third super block pool (SB Pool 3), the memory devices Die_1 and Diet of the first group and the memory devices Die_3 and Die_4 of the second group may separately configure their respective super blocks.

In accordance with an embodiment of the present disclosure, the number of memory devices to be allocated to each group may be variously adjusted according to the size of the storage area in which data corresponding to fast write requested by the host 300 is stored. Further, the size of data to be stored in a super block corresponding to each group may also be adjusted according to the number of memory devices allocated to the corresponding group.

Figure 13:
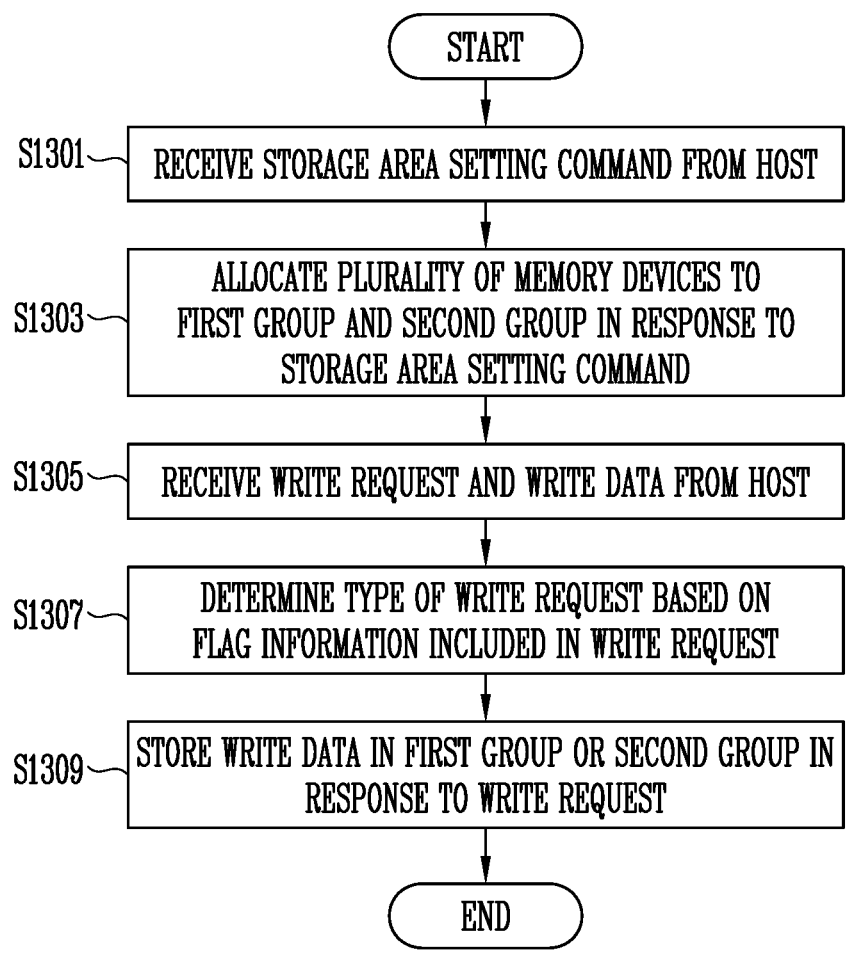
FIG. 13 is a flowchart illustrating an operation of a storage device according to an embodiment of the present disclosure.

FIG. 13 is a flowchart illustrating an operation of a storage device according to an embodiment of the disclosure.

Referring to FIG. 13, at step S1301, the storage device may receive a storage area setting command from a host.

At step S1303, the storage device may allocate a plurality of memory devices to a first group and a second group according to a data storage scheme in response to the storage area setting command. The storage device may allocate the memory devices to the first group for fast write and the second group for normal writing based on the size of a storage area in which data corresponding to fast write, included in the storage area setting command, is stored.

At step S1305, the storage device may receive a write request and write data from the host.

At step S1307, the storage device may determine a type of the write request whether the write request is a fast write request or a normal write request based on flag information included in the write request.

At step S1309, the storage device may store the write data in memory devices included in the first group or memory devices included in the second group according to the type of the write request.

Figure 14:
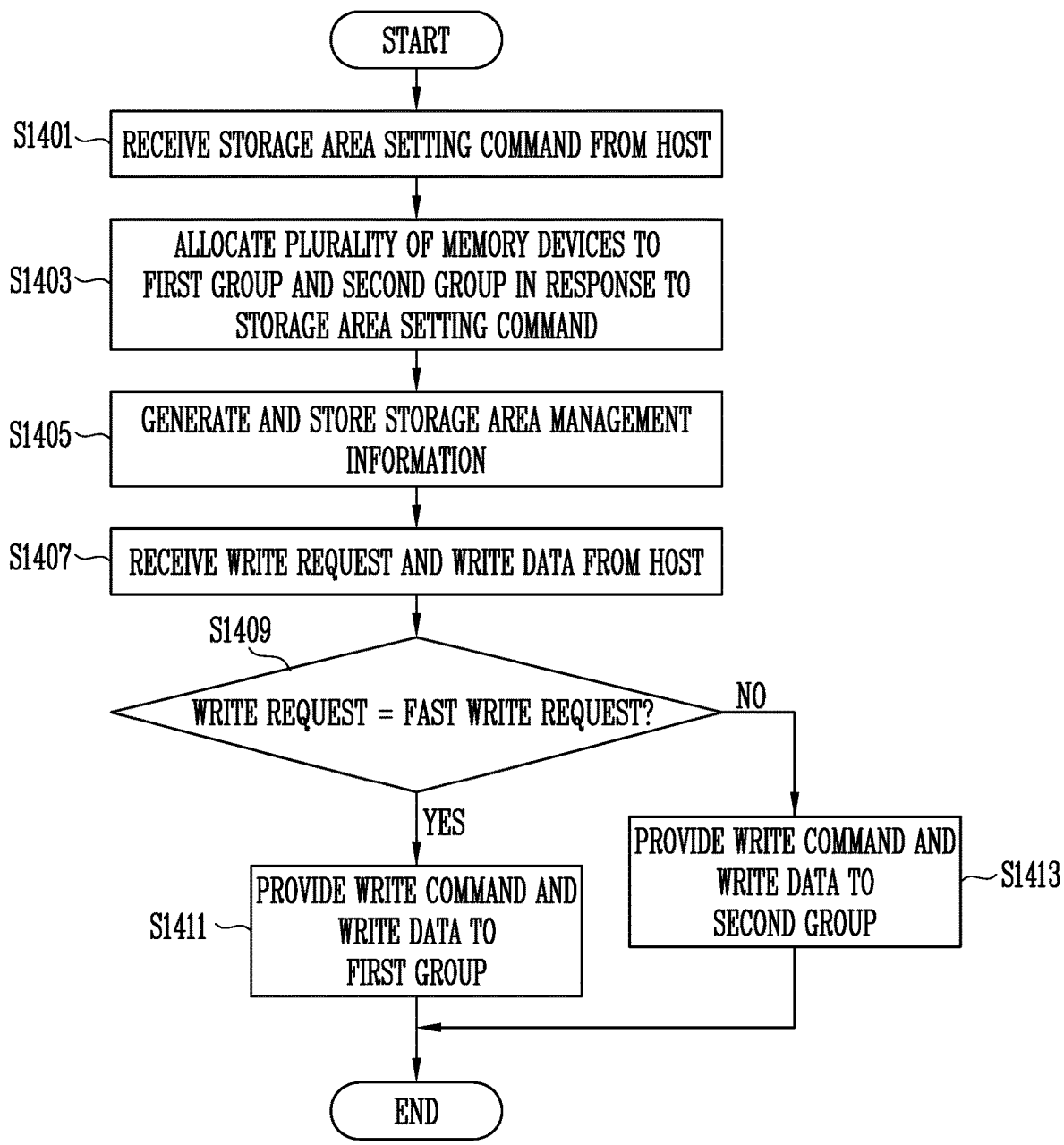
FIG. 14 is a flowchart illustrating an operation of a memory controller according to an embodiment of the present disclosure.

FIG. 14 is a flowchart illustrating an operation of a memory controller according to an embodiment of the present disclosure.

Referring to FIG. 14, at step S1401, the memory controller may receive a storage area setting command from a host.

At step S1403, the memory controller may allocate a plurality of memory devices to a first group and a second group according to a data storage scheme in response to the storage area setting command. The storage device may allocate the memory devices to the first group for fast write and the second group for normal writing based on the size of a storage area in which data corresponding to fast write, included in the storage area setting command, is stored.

At step S1405, the memory controller may generate storage area management information indicating the memory devices respectively allocated to the first group and the second group from among the plurality of memory devices. The memory controller may control the plurality of memory devices so that the generated storage area management information is stored in the memory devices.

At step S1407, the memory controller may receive a write request and write data from the host.

At step S1409, the memory controller may determine whether the write request is a fast write request or a normal write request based on flag information included in the write request. As a result of the determination, when the write request is a fast write request, the process proceeds to step S1411; otherwise, the process proceeds to step S1413.

At step S1411, the memory controller may provide the write data and a command for writing the data to the memory devices included in the first group.

At step S1413, the memory controller may provide the write data and a command for writing the data to the memory devices included in the second group.

Figure 15:
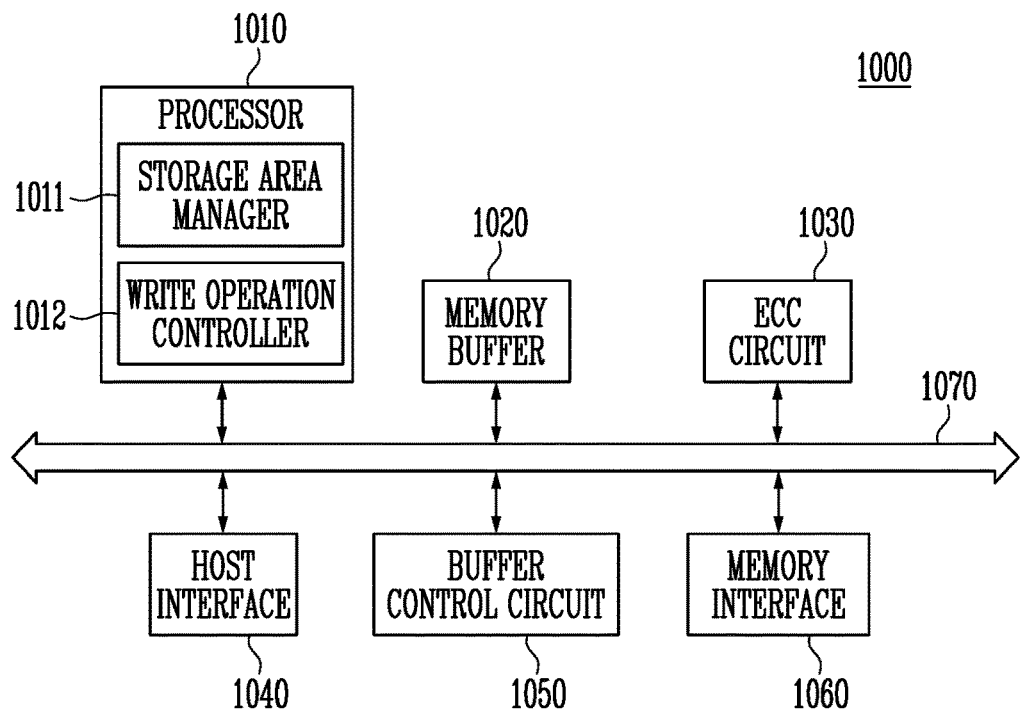
FIG. 15 is a diagram illustrating an embodiment of a memory controller of FIG. 1 according to an embodiment of the present disclosure.

FIG. 15 is a diagram illustrating an embodiment of the memory controller of FIG. 1.

Referring to FIG. 15, a memory controller 1000 is coupled to a host and a memory device. In response to a request received from the host, the memory controller 1000 may access the memory device. For example, the memory controller 1000 may be configured to control write, read, erase, and background operations of the memory device. The memory controller 1000 may provide an interface between the memory device and the host. The memory controller 1000 may run firmware for controlling the memory device.

The memory controller 1000 may include a processor 1010, a memory buffer 1020, an error correction circuit (Error Correcting Code: ECC circuit) 1030, a host interface 1040, a buffer control circuit 1050, a memory interface 1060, and a bus 1070.

The bus 1070 may provide channels between components of the memory controller 1000.

The processor 1010 may control the overall operation of the memory controller 1000 and may perform a logical operation. The processor 1010 may communicate with an external host through the host interface 1040 and also communicate with the memory device through the memory interface 1060. Further, the processor 1010 may communicate with the memory buffer 1020 through the buffer control circuit 1050. The processor 1010 may control the operation of the storage device by using the memory buffer 1020 as a working memory, a cache memory or a buffer memory.

The processor 1010 may perform the function of a flash translation layer (FTL). The processor 1010 may translate a logical block address (LBA), received from the host, into a physical block address (PBA) through the FTL. The FTL may receive the LBA using a mapping table and translate the LBA into the PBA. Examples of an address mapping method performed through the FTL may include various methods according to a mapping unit. Representative address mapping methods include a page mapping method, a block mapping method, and a hybrid mapping method.

The processor 1010 may randomize data received from the host. For example, the processor 1010 may use a randomizing seed to randomize data received from the host. The randomized data may be provided, as data to be stored, to the memory device and may be programmed in the memory cell array.

The processor 1010 may derandomize data received from the memory device during a read operation. For example, the processor 1010 may derandomize the data received from the memory device using a derandomizing seed. The derandomized data may be output to the host.

In an embodiment, the processor 1010 may run software or firmware to perform randomizing and derandomizing operations.

The memory buffer 1020 may be used as a working memory, a cache memory, or a buffer memory of the processor 1010. The memory buffer 1020 may store codes and commands executed by the processor 1010. The memory buffer 1020 may store data that is processed by the processor 1010. The memory buffer 1020 may include a static RAM (SRAM) or a dynamic RAM (DRAM).

The ECC circuit 1030 may perform error correction. The ECC circuit 1030 may perform error correcting code (ECC) encoding based on data to be written to the memory device through the memory interface 1060. The ECC-encoded data may be transferred to the memory device through the memory interface 1060. The ECC circuit 1030 may perform ECC decoding based on data received from the memory device through the memory interface 1060. In an example, the ECC circuit 1030 may be included as the component of the memory interface 1060 in the memory interface 1060.

The host interface 1040 may communicate with the external host under the control of the processor 1010. The host interface 1040 may perform communication using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods by way of non-limiting examples.

The buffer control circuit 1050 may control the memory buffer 1020 under the control of the processor 1010.

The memory interface 1060 may communicate with the memory device under the control of the processor 1010. The memory interface 1060 may transmit/receive commands, addresses, and data to/from the memory device through channels.

In an embodiment, the memory controller 1000 does not include the memory buffer 1020 and the buffer control circuit 1050.

In an embodiment, the processor 1010 may control the operation of the memory controller 1000 using codes. The processor 1010 may load codes from a nonvolatile memory device (e.g., ROM) provided in the memory controller 1000. In an embodiment, the processor 1010 may load codes from the memory device through the memory interface 1060.

In an embodiment, the bus 1070 of the memory controller 1000 may be divided into a control bus and a data bus. The data bus may be configured to transmit data in the memory controller 1000, and the control bus may be configured to transmit control information such as commands or addresses in the memory controller 1000. The data bus and the control bus may be isolated from each other, and may neither interfere with each other nor influence each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

In an embodiment, the processor 1010 may include a storage area manager 1011 and a write operation controller 1012. The storage area manager 1011 may store the storage area of the memory device in the same manner as the storage area manager 210 described above with reference to FIG. 8. The write operation controller 1012 may control a program operation of write data in the same manner as the write operation controller 220 described above with reference to FIG. 8.

Figure 16:
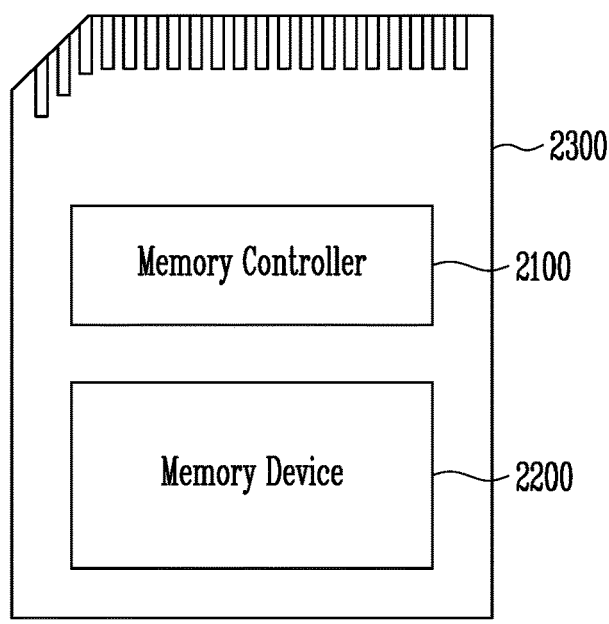
FIG. 16 is a block diagram illustrating a memory card system using a storage device according to an embodiment of the present disclosure.

FIG. 16 is a block diagram illustrating a memory card system to which the storage device according to an embodiment of the present disclosure is applied.

Referring to FIG. 16, a memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may be control read, write, erase, and background operations of the memory device 2200. The memory controller 2100 may provide an interface between the memory device 2200 and a host. The memory controller 2100 may run firmware for controlling the memory device 2200. The memory controller 2100 may be implemented in the same way as the memory controller 200 described above with reference to FIG. 1.

In an embodiment, the memory controller 2100 may include components, such as a RAM, a processor, a host interface, a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) protocols by way of non-limiting examples. In an embodiment, the connector 2300 may be defined by at least one of the above-described various communication protocols.

In an embodiment, the memory device 2200 may be implemented as any of various nonvolatile memory devices, such as for example an Electrically Erasable and Programmable ROM (EEPROM), a NAND flash memory, a NOR flash memory, a Phase-change RAM (PRAM), a Resistive RAM (ReRAM), a Ferroelectric RAM (FRAM), or a Spin-Torque Magnetic RAM (STT-MRAM).

The memory controller 2100 and the memory device 2200 may be integrated into a single semiconductor device to configure a memory card. For example, the memory controller 2100 and the memory device 2200 may be integrated into a single semiconductor device to configure a memory card such as a PC card (personal computer memory card international association: PCMCIA), a compact flash card (CF), a smart media card (SM or SMC), a memory stick, a multimedia card (MMC, RS-MMC, MMCmicro or eMMC), a SD card (SD, miniSD, microSD, or SDHC), or a universal flash storage (UFS).

Figure 17:
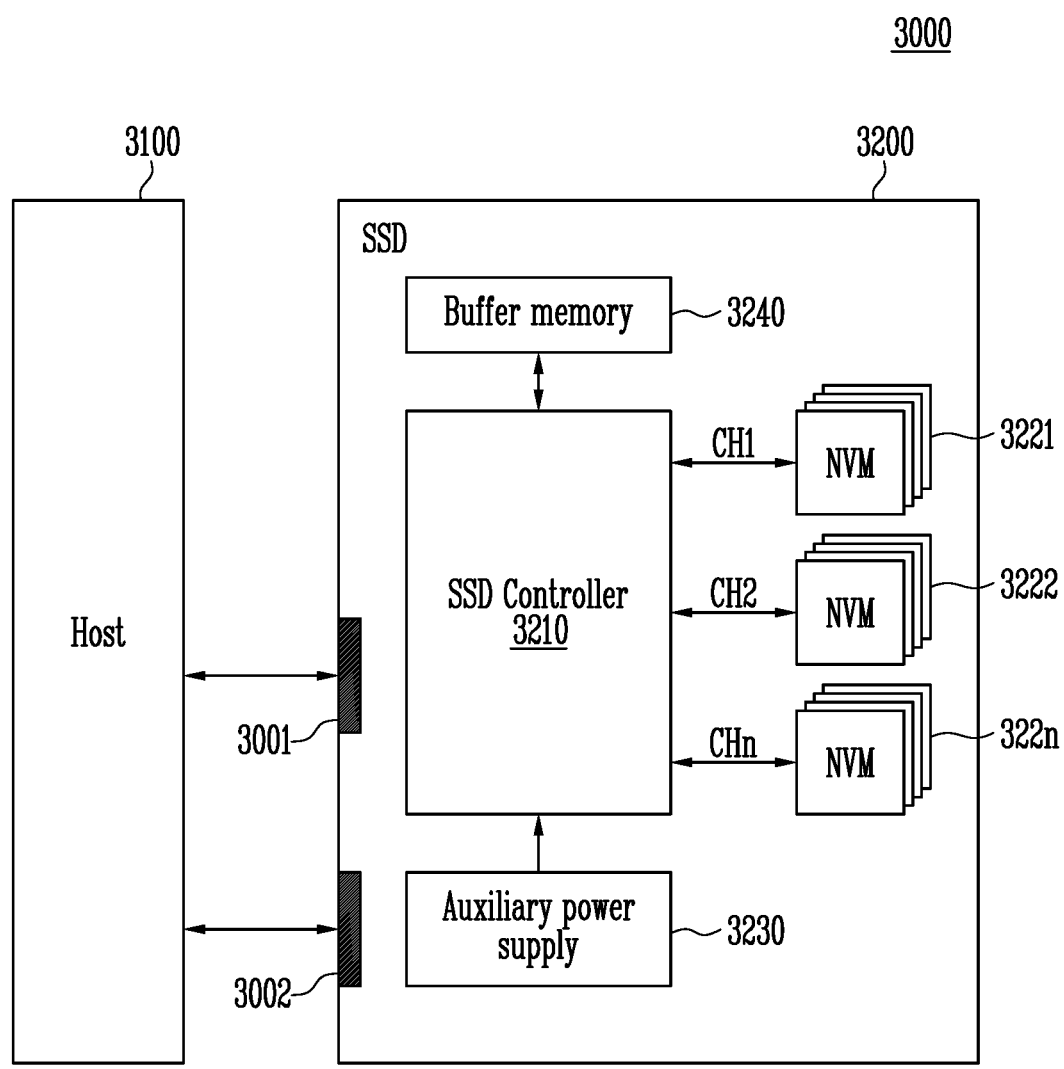
FIG. 17 is a block diagram illustrating a solid state drive (SSD) system using a storage device according to an embodiment of the present disclosure.

FIG. 17 is a block diagram illustrating a solid state drive (SSD) system to which the storage device according to an embodiment of the present disclosure is applied.

Referring to FIG. 17, an SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322n, an auxiliary power supply 3230, and a buffer memory 3240.

In accordance with an embodiment of the present disclosure, the SSD controller 3210 may perform the function of the memory controller 200 described above with reference to FIG. 1.

The SSD controller 3210 may control the plurality of flash memories 3221 to 322n in response to the signals SIG received from the host 3100. In an embodiment, the signals SIG may be signals based on the interfaces of the host 3100 and the SSD 3200. For example, the signals SIG may be signals defined by at least one of various interfaces such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, or nonvolatile memory express (NVMe) interfaces.

The auxiliary power supply 3230 may be coupled to the host 3100 through the power connector 3002. The auxiliary power supply 3230 may be supplied with power PWR from the host 3100 and may be charged. The auxiliary power supply 3230 may supply the power of the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322n, or may temporarily store metadata (e.g., mapping tables) of the flash memories 3221 to 322n. The buffer memory 3240 may include volatile memories such as DRAM, SDRAM, DDR SDRAM, LPDDR SDRAM, and GRAM or nonvolatile memories such as FRAM, ReRAM, STT-MRAM, and PRAM for example.

Figure 18:
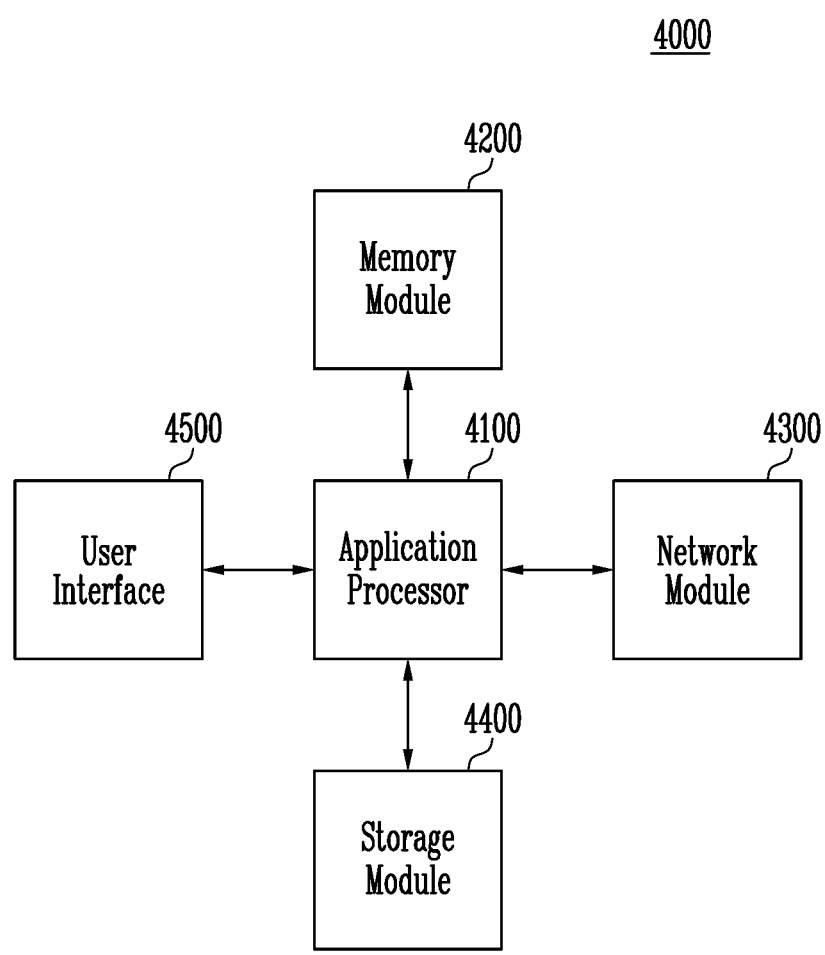
FIG. 18 is a block diagram illustrating a user system using a storage device according to an embodiment of the present disclosure.

FIG. 18 is a block diagram illustrating a user system to which the storage device according to an embodiment of the present disclosure is applied.

Referring to FIG. 18, a user system 4000 may include an application processor 4100, a memory module 4200, a network module 4300, a storage module 4400, and a user interface 4500.

The application processor 4100 may run components included in the user system 4000, an Operating System (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDRAM, LPDDR2 SDRAM, and LPDDR3 SDRAM, or nonvolatile RAMs such as PRAM, ReRAM, MRAM, and FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), WiMAX, WLAN, UWB, Bluetooth, or Wi-Fi communication. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may be operated in the same or substantially same way as the storage device 50 described above with reference to FIG. 1. The storage module 4400 may include a plurality of nonvolatile memory devices, each of which may be operated in the same or substantially same way as the memory device 100 described above with reference to FIG. 1.

The user interface 4500 may include interfaces which input data or instructions to the application processor 4100 or which output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, and a motor.

In accordance with the present disclosure, there are provided a storage device having improved write performance and a method of operating the storage device.

What is claimed is:

1. A memory controller, connected to a plurality of memory devices that are divided into a first group and a second group, the memory controller comprising:
    a storage area manager configured to determine a total number of first super blocks included in the first group and a total number of second super blocks included in the second group based on information corresponding to a storage area setting command provided from a host; and
    a write operation controller configured to control the plurality of memory devices to store data in one of the first super blocks in response to a first write request from the host and to store data in one of the second super blocks in response to a normal write request from the host,
    wherein each of the first super blocks and the second super blocks includes one or more memory blocks selected from the first group and the second group respectively,
    wherein, the first super blocks and the second super blocks in which the data is stored are coupled to the memory controller through a single channel,
    wherein the storage area manager is configured to allocate a quarter of the plurality of the memory devices to the first group if a ratio of a storage area, in which the data corresponding to the first write request is stored, to an entire storage area is greater than 0 and less than a first threshold ratio and to allocate a half of the plurality of the memory devices to the first group if the ratio is equal to or greater than the first threshold ratio and less than a second threshold ratio, and
    wherein the first super blocks include memory cells storing n data bits per cell, where n is a natural number of 1 or more, and the second super blocks include memory cells storing m data bits per cell, where m is different from n, and where m is a natural number of 2 or more, and m is greater than n.

2. The memory controller according to claim 1, wherein each of the first write request and the normal write request includes a flag indicating whether a write request is the first write request or the normal write request.

3. The memory controller according to claim 2,
    wherein the write operation controller determines a selected group among the first group and the second group based on the flag and controls the selected group of memory devices to store the data in response to the write request, and
    wherein the write operation controller determines the first group as the selected group when the flag indicates the first write request.

4. The memory controller according to claim 1,
    wherein the storage area manager allocates memory blocks included in at least two memory devices of the first group as the first super block and allocates memory blocks included in at least two memory devices of the second group as the second super block.

5. The memory controller according to claim 1, wherein:
    each of memory devices included in the first group and memory devices included in the second group comprises a plurality of planes,
    each of the plurality of planes comprises a plurality of memory blocks,
    the storage area manager allocates memory blocks included in at least two planes of a memory device in the first group as the first super block, and
    the storage area manager allocates memory blocks included in at least two planes of a memory device in the second group as the second super block.

6. The memory controller according to claim 1, wherein the storage area setting command includes a size of a storage area for first write.

7. The memory controller according to claim 1, wherein:
the storage area manager generates storage area management information for memory devices included in the first group and memory devices included in the second group, and
the storage area management information is stored in the plurality of memory devices.

8. The memory controller according to claim 7, wherein the storage area manager is configured to allocate memory devices to the first group and the second group based on the storage area management information received from the plurality of memory devices when the plurality of memory devices are booted up.

9. A storage device, comprising:
a plurality of memory devices that are divided into a first group and a second group; and
a memory controller, connected to the plurality of memory devices, configured to determine a total number of first super blocks included in the first group and a total number of second super blocks included in the second group based on information corresponding to a storage area setting command provided from a host and to control the plurality of memory devices to store data in one of the first super blocks in response to a first write request from the host and to store data in one of the second super blocks in response to a normal write request from the host,
wherein each of the first super blocks and the second super blocks includes one or more memory blocks selected from the first group and the second group respectively, and
wherein the first super blocks and the second super blocks in which the data is stored are coupled to the memory controller through a single channel,
wherein the memory controller is configured to allocate a quarter of the plurality of the memory devices to the first group if a ratio of a storage area, in which the data corresponding to the first write request is stored, to an entire storage area is greater than 0 and less than a first threshold ratio and to allocate a half of the plurality of the memory devices to the first group if the ratio is equal to or greater than the first threshold ratio and less than a second threshold ratio, and
wherein the first super blocks include memory cells storing n data bits per cell, where n is a natural number of 1 or more, and the second super blocks include memory cells storing m data bits per cell, where m is different from n, and where m is a natural number of 2 or more, and m is greater than n.

10. The storage device according to claim 9, wherein the memory controller allocates memory blocks included in at least two memory devices of the first group as the first super block, and allocates memory blocks included in at least two memory devices of the second group as the second super block.

11. The storage device according to claim 9,
wherein each of the first write request and the normal write request includes a flag indicating whether a write request is the first write request or the normal write request,
wherein a write operation controller determines a selected group among the first group and the second group based on the flag and controls the selected group of memory devices to store the data in response to the write request, and
wherein the memory controller determines the first group as the selected group when the write request is the first write request.

12. A method of operating a storage device including a plurality of memory devices that are divided into a first group and a second group and a memory controller connected to the plurality of memory devices for controlling the memory devices, the method comprising:
determining a total number of first super blocks included in the first group and a total number of second super blocks included in the second group based on information corresponding to a storage area setting command provided from a host; and
storing data in one of the first super blocks in response to a first write request from the host or in one of the second super blocks in response to a normal write request from the host,
wherein each of the first super blocks and the second super blocks includes one or more memory blocks selected from the first group and the second group respectively, and
wherein each of the first super blocks and the second super blocks is coupled to the memory controller through a single channel,
wherein determining a total number of first super blocks comprises allocating a quarter of the plurality of the memory devices to the first group if a ratio of a storage area, in which the data corresponding to the first write request is stored, to an entire storage area is greater than 0 and less than a first threshold ratio and allocating a half of the plurality of the memory devices to the first group if the ratio is equal to or greater than the first threshold ratio and less than a second threshold ratio, and
wherein, the first super blocks include memory cells storing n data bits per cell, where n is a natural number of 1 or more, and the second super blocks include memory cells storing m data bits per cell, where m is different from n, and where m is a natural number of 2 or more, and m is greater than n.

* * * * *